US007290204B1

(12) United States Patent
Kanno et al.

(10) Patent No.: US 7,290,204 B1
(45) Date of Patent: Oct. 30, 2007

(54) REMOTE SLIDE SHOW SYSTEM USING A BROWSER

(75) Inventors: Hironori Kanno, Miyagi (JP);
Yoshiyuki Hirashima, Miyagi (JP);
Mikio Furuyama, Miyagi (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/477,452

(22) Filed: Jan. 4, 2000

Related U.S. Application Data

(63) Continuation-in-part of application No. 09/244,043, filed on Feb. 4, 1999, now Pat. No. 7,047,489.

(30) Foreign Application Priority Data

Jul. 29, 1998 (JP) ................................. 10-213799
Jun. 30, 1999 (JP) ................................. 11-184852

(51) Int. Cl.
*G06F 15/00* (2006.01)
*G06F 17/00* (2006.01)
*G06F 15/16* (2006.01)

(52) U.S. Cl. .............................. 715/501.1; 715/500.1; 709/203

(58) Field of Classification Search ............ 715/500.1, 715/501.1; 709/203
See application file for complete search history.

(56) References Cited

U.S. PATENT DOCUMENTS

| 5,774,662 | A | * | 6/1998 | Sakagawa ............... 370/395.54 |
| 5,809,247 | A | * | 9/1998 | Richardson et al. ........ 709/218 |
| 5,812,736 | A | * | 9/1998 | Anderson .................... 386/96 |
| 5,890,172 | A | * | 3/1999 | Borman et al. .......... 715/501.1 |
| 6,008,807 | A | * | 12/1999 | Bretschneider et al. ..... 715/732 |
| 6,041,333 | A | * | 3/2000 | Bretschneider et al. ..... 707/203 |
| 6,072,480 | A | * | 6/2000 | Gorbet et al. ............... 715/730 |
| 6,084,582 | A | * | 7/2000 | Qureshi et al. .......... 715/500.1 |
| 6,128,712 | A | * | 10/2000 | Hunt et al. ................. 711/158 |
| 6,155,840 | A | * | 12/2000 | Sallette ...................... 434/323 |
| 6,157,364 | A | * | 12/2000 | Kohler ....................... 715/855 |
| 6,163,779 | A | * | 12/2000 | Mantha et al. .............. 707/100 |
| 6,182,122 | B1 | * | 1/2001 | Berstis ....................... 709/217 |
| 6,195,679 | B1 | * | 2/2001 | Bauersfeld et al. ......... 709/203 |
| 6,199,076 | B1 | * | 3/2001 | Logan et al. ............. 715/501.1 |
| 6,209,027 | B1 | * | 3/2001 | Gibson ....................... 709/218 |
| 6,286,029 | B1 | * | 9/2001 | Delph ......................... 709/203 |
| 6,287,125 | B1 | * | 9/2001 | Dorcely ...................... 434/323 |
| 6,338,075 | B2 | * | 1/2002 | Fukuda .................... 715/501.1 |
| 6,473,609 | B1 | * | 10/2002 | Schwartz et al. ........... 455/406 |
| 6,598,075 | B1 | * | 7/2003 | Ogdon et al. ............... 709/204 |
| 6,904,450 | B1 | * | 6/2005 | King et al. ................. 709/203 |
| 2007/0033528 | A1 | * | 2/2007 | Merril et al. ............... 715/732 |

OTHER PUBLICATIONS

Tatsuro Kitazato, "NEC Developed Software for Automatically Updating WWW Documents like a Picture-story Show", Nikkei Electronics, Nikkei BP corporation, No. 687, Apr. 1997, pp. 24 and 25.
Shinji Simojo, "Multimedia Scenario Descriptive Language SMIL" UNIX magazine, ASCII Corporation, vol. 13, No. 7, Jul. 1998, pp. 40-45.
Notice of Rejection Grounds (Office Action) in corresponding Japanese Patent Application No. H11-184852 mailed Sep. 6, 2005.
Notice of Rejection Grounds mailed on Jul. 4, 2006 for the corresponding Japanese Patent Application.
'Detailed Guide to Useful Internet Related Programs: Let's Try! "WWWC"', INTERNET magazine, Japan, Impress Co., Ltd., Jul. 1, 1998, No. 42, p. 328-331.

* cited by examiner

*Primary Examiner*—Rachna Singh
(74) *Attorney, Agent, or Firm*—Staas & Halsey LLP

(57) ABSTRACT

A plurality of uniform resource locators are automatically notified from a local side computer to one or more remote side computers in a predetermined sequence and at predetermined intervals, and the browser of each of the remote side computers displays the corresponding web pages.

7 Claims, 26 Drawing Sheets

| FLAG NAME=FLAG | MEANING |
|---|---|
| AUTO=Yes | AUTOMATIC DISPLAY IS PERFORMED? Yes OR No |
| MAXNUM=20 | MAXIMUM VALUE OF DISPLAY SEQUENCE NUMBER |
| WAIT(i)=60 | IN CASE OF AUTOMATIC DISPLAY, INTERVAL BETWEEN DISPLAYS (SECONDS) (i=1..MAXNUM) |
| BGM(i)=Yes | BGM IS PLAYED? Yes OR No (i=1..MAXNUM) |
| BGM_FILE(i)=song.avi | FILE OF BGM (i=1..MAXNUM) |
| NARRATION(i)=Yes | NARRATION IS PLAYED BACK? Yes OR No (i=1..MAXNUM) |
| NARRATION_FILE(i)=nal.avi | FILE OF NARRATION (i=1..MAXNUM) |

F I G. 5

| TITLE | URL | IMAGE FILE NAME | COMMENT | COORDINATE VALUE | DISPLAY SEQUENCE NUMBER |
|---|---|---|---|---|---|
| xxx HOME Page | http://www.xxx.co.jp | xxx1.bmp | hogehoge... | 10, 10 | 1 |
| yyy HOME Page | http://www.yyy.co.jp | xxx3.bmp | hogehoge... | 40, 10 | 3 |
| zzz HOME Page | file:///D\|/cache/file1.html | xxx4.bmp | hogehoge... | 80, 10 | 5 |
| : | : | : | : | : | : |

FIG. 6

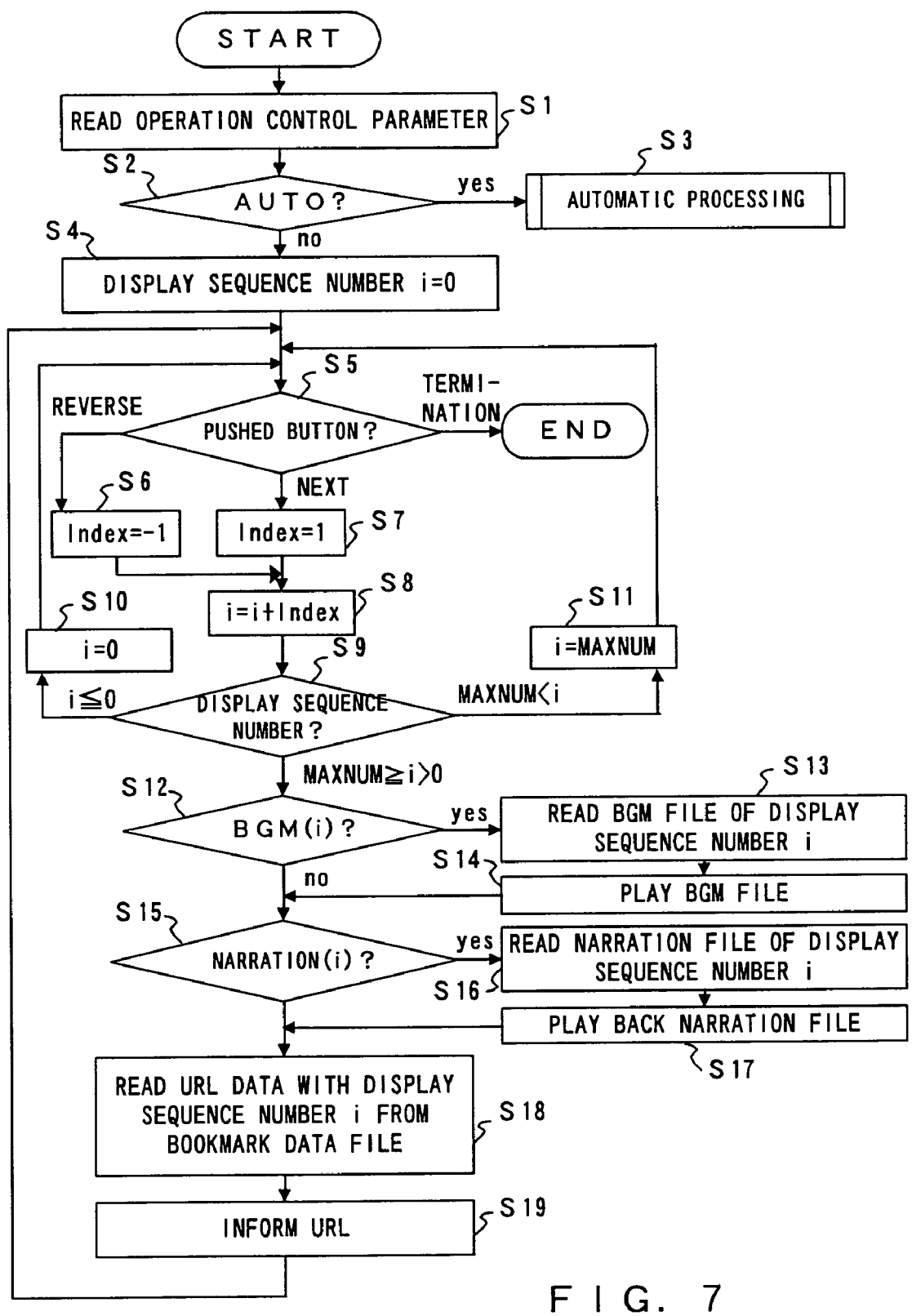
F I G. 7

| FLAG NAME=FLAG | MEANING |
|---|---|
| AUTO=Yes | AUTOMATIC DISPLAY IS PERFORMED ? Yes OR No |
| MAXNUM=20 | MAXIMUM VALUE OF DISPLAY SEQUENCE NUMBER |
| WAIT=60 | IN CASE OF AUTOMATIC DISPLAY, INTERVAL BETWEEN DISPLAYS (SECONDS) |
| BGM=Yes | BGM IS PLAYED ? Yes OR No |
| BGM_FILE=song.avi | FILE OF BGM |
| NARRATION=Yes | NARRATION IS PLAY BACK ? Yes OR No |
| NARRATION_FILE=nal.avi | FILE OF NARRATION |

F I G. 1 0

| FLAG NAME = FLAG | MEANING |
|---|---|
| S_PUSH=Yes | WHETHER OR NOT (Yes OR No) LOCAL SIDE CAN ISSUE DISPLAY INSTRUCTION TO REMOTE SIDE |
| S_ACCEPT=Yes | WHETHER OR NOT (Yes OR No) REMOTE SIDE ACCEPTS DISPLAY INSTRUCTION FROM LOCAL SIDE |
| B_PUSH=Yes | WHETHER OR NOT (Yes OR No) LOCAL SIDE CAN ISSUE BOOKMARK DATA REGISTRATION INSTRUCTION TO REMOTE SIDE |
| B_ACCEPT=Yes | WHETHER OR NOT (Yes OR No) REMOTE SIDE ACCEPTS BOOKMARK DATA REGISTRATION INSTRUCTION FROM LOCAL SIDE |
| AUTO=Yes | WHETHER OR NOT (Yes OR No) TO PERFORM AUTOMATIC DISPLAY |
| MAXNUM=20 | MAXIMUM VALUE OF DISPLAY SEQUENCE NUMBER |
| WAIT(i)=60 | INTERVAL AT DISPLAYS (SECONDS) FOR AUTOMATIC DISPLAY (i=1 ...MAXNUM) |

F I G. 1 4

| IP ADDRESS | S_FLAG_S | S_FLAG_R | B_FLAG_S | B_FLAG_R | COMMENT |
|---|---|---|---|---|---|
| 192.168.0.1 | OFF | ON | OFF | ON | TEACHER'S MACHINE |
| 192.168.0.10 | ON | OFF | ON | OFF | STUDENT'S MACHINE 1 |
| 192.168.0.11 | ON | OFF | ON | OFF | STUDENT'S MACHINE 2 |
| 192.168.0.12 | ON | OFF | ON | OFF | STUDENT'S MACHINE 3 |
| 192.168.0.13 | ON | OFF | ON | OFF | STUDENT'S MACHINE 4 |
| 192.168.0.14 | ON | OFF | ON | OFF | STUDENT'S MACHINE 5 |
| .. | .. | .. | .. | .. | .. |

FIG. 15

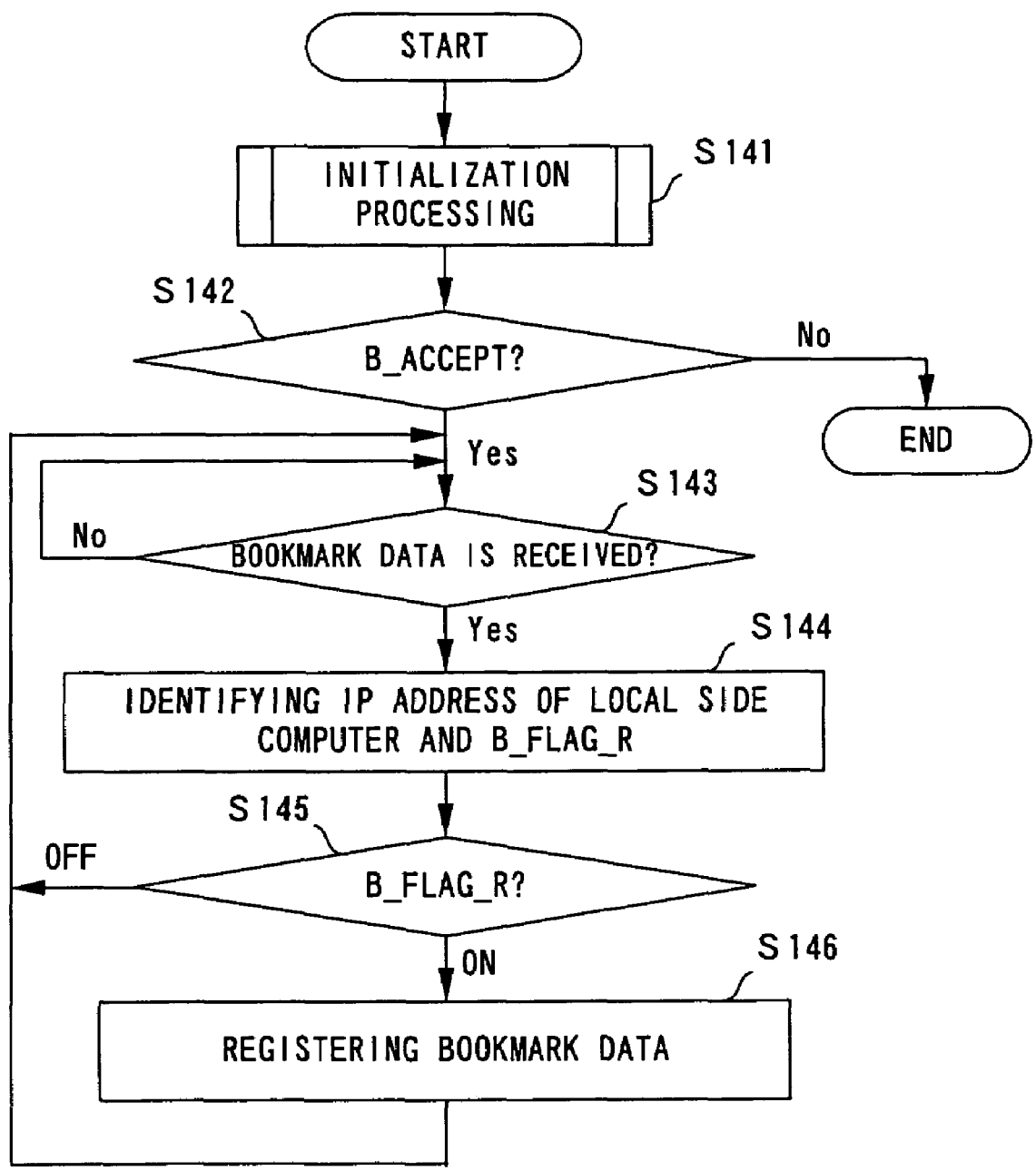
F I G. 2 3

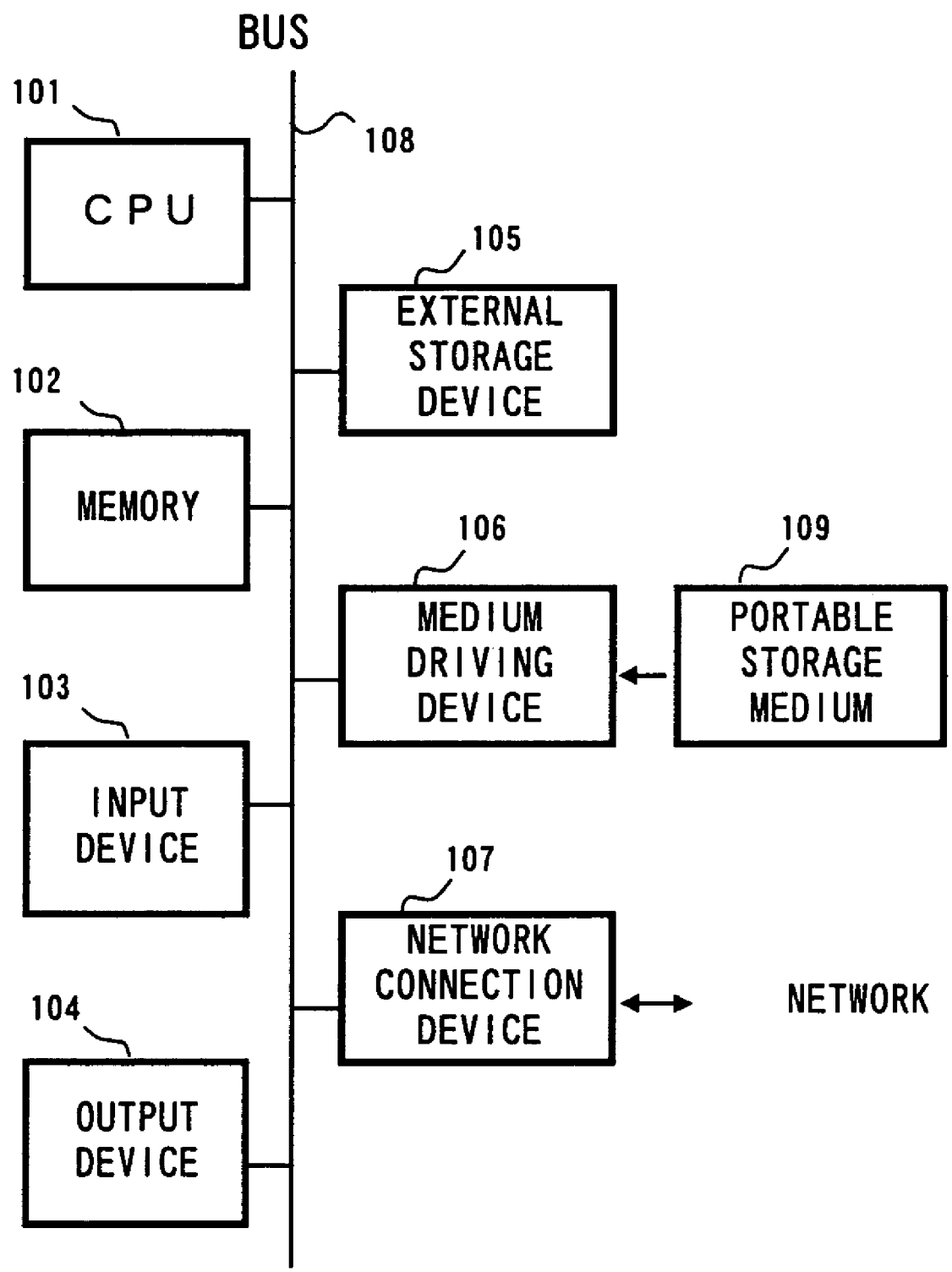
F I G. 24

REMOTE SLIDE SHOW SYSTEM USING A BROWSER

CROSS REFERENCE TO RELATED APPLICATION

The application is a continuation-in-part application of Ser. No. 09/244,043, now U.S. Pat. No. 7,047,489 filed on Feb. 4, 1999, which is incorporated by reference in this application.

BACKGROUND OF THE INVENTION

1. Field of the Invention

The present invention relates to a slide show system for performing a remote slide show by using the screen information obtained by a browser in one or more browser systems referring to an information network such as a WWW (World Wide Web) which is currently a main source of information on the Internet.

2. Description of the Related Art

The Internet is realized by connecting a plurality of computers via a communication network. A world-wide information network which is realized by the Internet is named a WWW system. Recently, as an amount of information transmission increases over the WWW system, various kinds of multi-media information have been provided on the Internet.

A page of the WWW (a web page) is a unit of the multi-media information to be provided on the WWW, and is composed of an HTML (HyperText Markup Language) document and related data which are stored in an arbitrary WWW server. The WWW server transmits this web page to a browser provided on a WWW client according to an HTTP (HyperText Transfer Protocol). The WWW browser displays the thus-received web page on a screen of the WWW client.

The web page generally can provide text information composed of character data, image information composed of graphic data, audio information, animation information or the like to a user by using the HTML. Therefore, here, the display of a web page includes not only the outputting of text information or image information but also the outputting audio information, animation information or the like, which is included in the web page.

In order that a user accesses such information, it is necessary to input address information which uniquely represents a server and an HTML document storing that information. This address information is composed of several character strings and is named a URL (Uniform Resource Locator).

However, it is difficult for a user to remember a complicated URL composed of several tens of characters for a long time. Further, in a case where a predetermined page is required to be referred to many times, it is neither convenient nor effective to type this URL every time. Therefore, in order to easily display a web page, a WWW browser is generally provided with a function named a bookmark.

The bookmark function is to register a site which a user is fond of and a page which is frequently accessed, in a browser. The user first registers the URL of a page to be displayed as a bookmark. Then, at the time of accessing, the user displays a list of pages which are registered as bookmarks, and selects a desired page by clicking a mouse. Thus, the user can display his or her desired page without inputting a complicated URL.

FIG. 1 shows an example of a representative bookmark display screen. As shown in FIG. 1, a set of bookmarks 2 can be stored in a folder 1, and the bookmarks 2 are hierarchically managed.

In a folder "Lookup", bookmarks 2 such as "People" and "Yellow Pages" are registered. These bookmarks 2 are list-displayed by clicking the folder "Lookup". The user selects a desired page by double-clicking a line (an object) indicating the bookmark 2 such as "People" or the like so that he or she can display the desired page on a screen.

However, there arise the following problems about the above-mentioned conventional WWW browser:

Recently, as the functions of a portable personal computer become enhanced and its cost decreases, a lot of presentations and conferences have taken place using such a personal computer. When such presentations or conferences take place, information of a web page is frequently displayed by connecting the personal computer to the Internet.

However, there are a lot of cases where time is greatly restricted when a presentation or a conference is taking place. Therefore, it is neither convenient nor effective to type the above-mentioned URL every time. Therefore, it is thought that the bookmark function is used as a method of quickly displaying a web page. However, this case also requires a lot of effort to display a list of bookmarks and to click the bookmark of a desired page each time, so that it takes a predetermined operation time period to display a page in a browser.

There is a case where a speaker explains pages changing some pages every few minutes according to the contents of a presentation. In this case, it is necessary to type a URL or select a bookmark whenever changing pages, so that a sufficient explanation cannot be given since the speaker spends a lot of time for operation of the browser system.

Furthermore, on educational scenes, lessons or lectures have been given by referring to the information on web pages with many personal computers connected to the Internet. Repeated at this time are the procedures such that a teacher or professor writes a URL on a blackboard or in a textbook or orally specifies the URL, and each student inputs the URL to the WWW browser of his or her own personal computer so that each student refers to the page specified by the teacher or professor.

However, when each student inputs a URL to his or her own WWW browser, an input may be erroneously made or a considerable amount of time may be taken in some cases, which leads to an obstacle to the smooth progress of a lesson or lecture.

Accordingly, use of a bookmark capability is considered to reduce a student's load of directly inputting a URL, and to ensure the specification of a URL with ease. If it is necessary to use many personal computers at the same time, required bookmark data are preset for each personal computer, and the data after being used is deleted in order to restore the personal computer to its original state. In this case, a considerable amount of time is required to prepare and postprocess the bookmark data, which causes an inconvenience.

SUMMARY OF THE INVENTION

An object of the present invention is to provide a slide show system for performing an effective slide show by easily and efficiently displaying the information of one or more web pages, when a presentation, a conference, a lesson or lecture, etc. is given with the use of a browser system which refers to a WWW system.

A slide show system in a first aspect of the present invention comprises a control unit and an interface unit. The control unit obtains the address information defined on an information network according to a predetermined output sequence. The interface unit transmits the obtained address information to a remote side, and instructs the output of the information corresponding to the transmitted address information.

A slide show system in a second aspect of the present invention comprises a browser unit, an interface unit, and a control unit. The browser unit obtains information by using the address information defined on an information network, and outputs the obtained information. The interface unit receives the address information transmitted from a local side according to a predetermined output sequence. The control unit notifies the browser unit of the received address information, and instructs the output of the information corresponding to the notified address information.

BRIEF DESCRIPTION OF THE DRAWINGS

FIG. 5 is a diagram showing a first operation control parameter file;

FIG. 6 is a diagram showing a bookmark data file;

FIG. 7 is a flowchart showing display control processing;

FIG. 10 is a diagram showing a second operation control parameter file;

FIG. 14 is a diagram showing a third operation control parameter file;

FIG. 15 is a diagram showing an IP address table;

FIG. 23 is a flowchart showing registration processing on the remote side;

FIG. 24 is a diagram showing the configuration of an information processing device.

DESCRIPTION OF THE PREFERRED EMBODIMENTS

The preferred embodiments of the present invention will be explained in detail below with reference to the drawings.

Figure 2A:
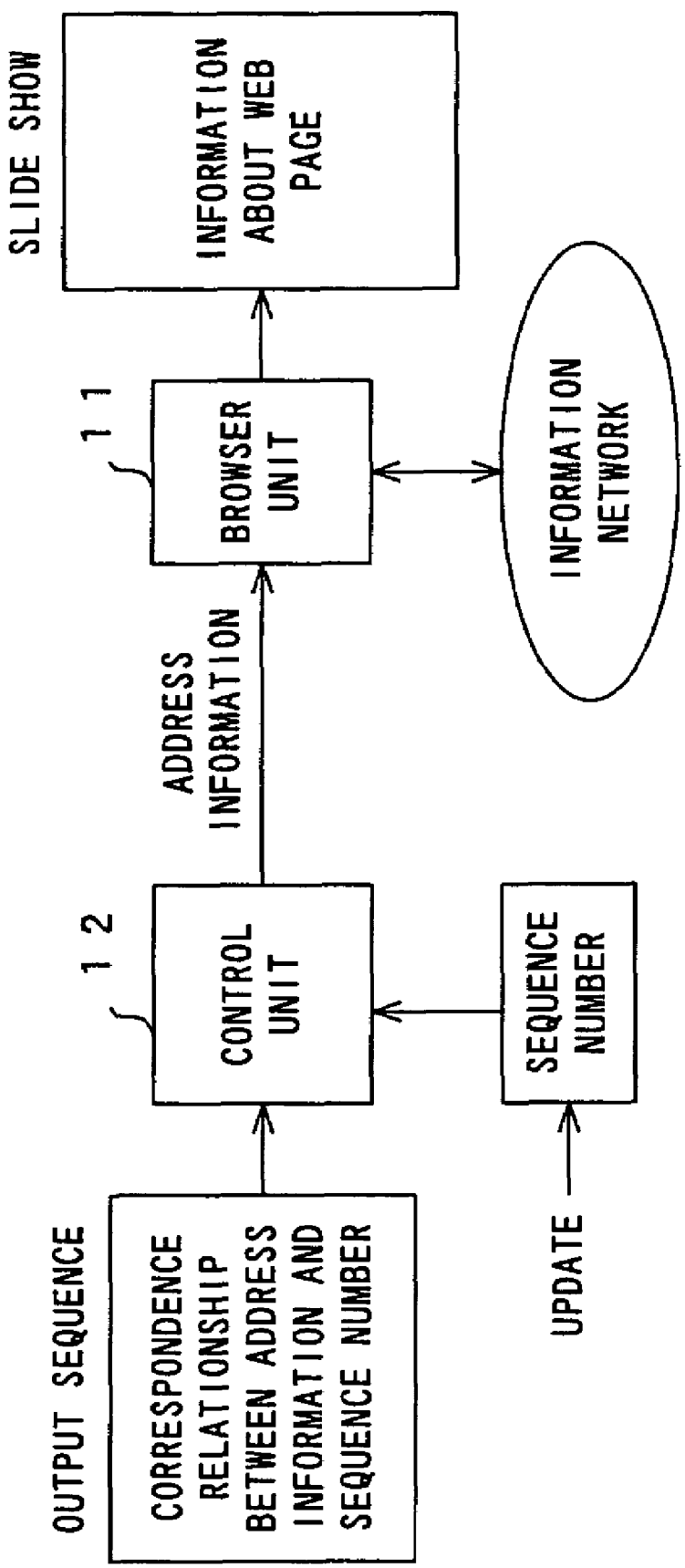
FIG. 2A is a principle diagram showing the slide show system according to the present invention.

FIG. 2A is a principle diagram of the slide show system according to the first principle of the present invention. The slide show system shown in FIG. 2A includes a browser unit 11 and a control unit 12.

The browser unit 11 obtains information using the address information defined on an information network, and outputs the thus-obtained information. The control unit 12 informs the address information to the browser unit 11 according to a predetermined output sequence, and instructs the browser unit 11 to output information corresponding to the thus-informed information.

The address information defined on the information network corresponds to, for example, the URL defined on a WWW system. The information obtained using the address information corresponds to, for example, the multi-media information of a web page.

The output sequence of information is predetermined by preparing a correspondence relationship between one or more pieces of the address information and a sequence number. The control unit 12 informs the address information corresponding to the current sequence number to the browser unit 11, according to this output sequence. Thus, the browser unit 11 obtains information using the thus-informed address information, and can output the thus-obtained information.

When the current sequence number is updated, new address information is informed from the control unit 12 to the browser unit 11, and new information is outputted. By repeating these operations, information of web pages to be outputted is sequentially updated so that a slide show can be performed by using the web pages.

According to this slide show system, the control unit 12 informs the address information to the browser unit 11 according to the output sequence so that a user need not type a URL nor select a bookmark whenever pages are switched. Therefore, the user can concentrate on the explanation of the displayed information.

For example, the browser unit 11 shown in FIG. 2A corresponds to a WWW browser 33, a display device 24, and a speaker 25 shown in FIG. 2B, which will be described later. The control unit 12 shown in FIG. 2A corresponds to a slide show processing unit 31 shown in FIG. 2B.

The slide show system according to the second principle of the present invention comprises a control unit and an interface unit. The control unit obtains the address information defined on an information network according to a predetermined output sequence. The interface unit transmits the obtained address information to a remote side, and instructs the output of the information corresponding to the transmitted address information.

With such a slide show system, a slide show can be simultaneously performed while a teacher's personal computer (PC) transmits address information to one or more students' PCs on an educational scene. As a result, each student no longer need to input the address information, whereby a lesson or lecture smoothly proceeds.

Figure 13:
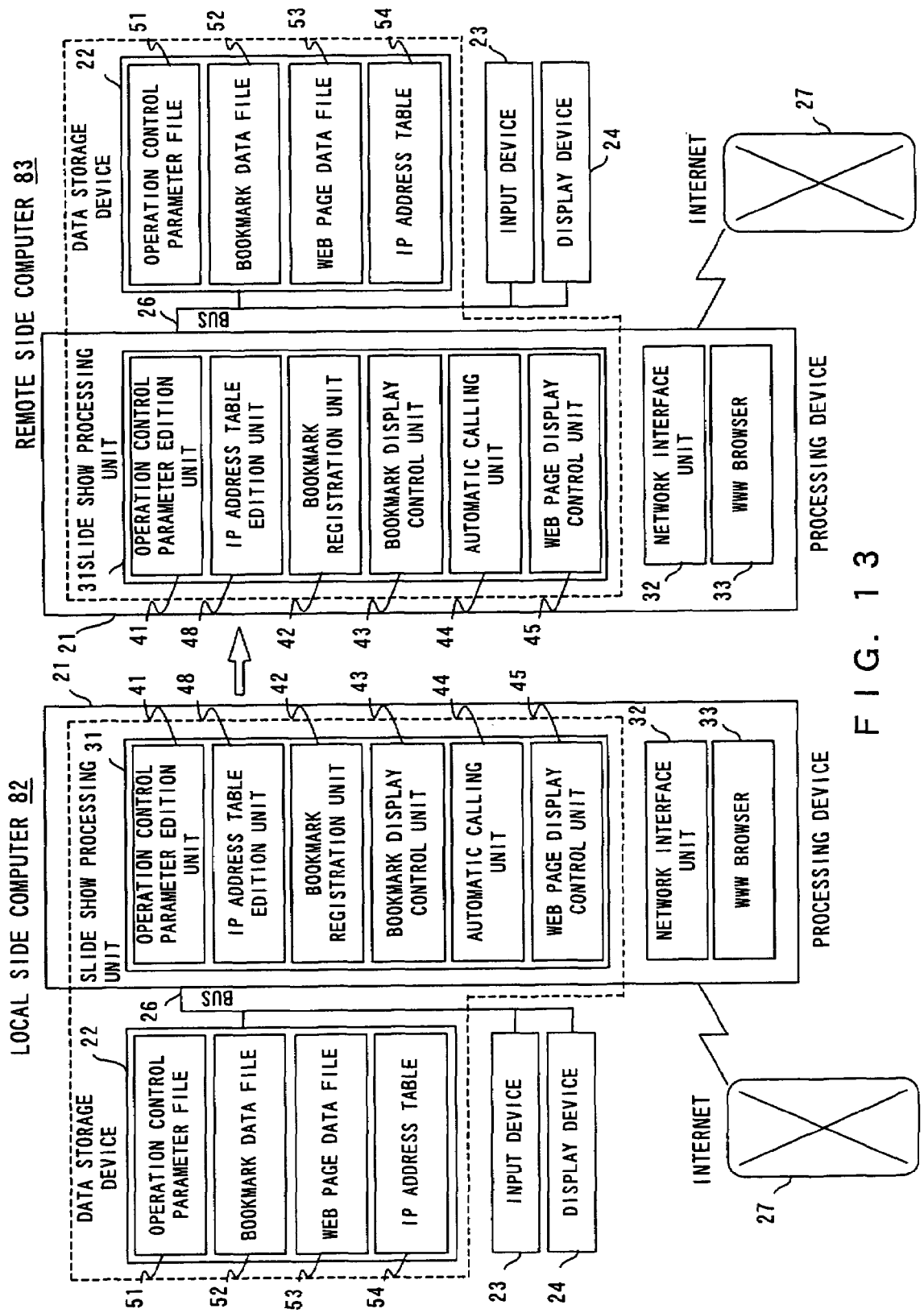
FIG. 13 is a diagram showing the configurations of a local side computer and a remote side computer.

For example, the slide show system according to the second principle of the present invention corresponds to a local side computer 82 which is shown in FIG. 13 and will be described later, the control unit corresponds to a slide show processing unit 31 of the local side computer 82, and the interface unit corresponds to a network interface unit 32 of the local side computer 82.

A slide show system according to the third principle of the present invention comprises a browser unit, an interface unit, and a control unit. The browser unit obtains information by using the address information defined on an information network, and outputs the obtained information. The interface unit receives the address information transmitted from a local side according to a predetermined output sequence. The control unit notifies the browser unit of the received address information, and instructs the output of the information corresponding to the notified address information.

With such a slide show system, a slide show can be simultaneously performed while one or more students'PCs receive address information from a teacher's PC on an educational scene, etc. As a result, each student no longer need to input the address information, whereby a lesson or lecture smoothly proceeds.

For example, the slide show system according to the third aspect of the present invention corresponds to a remote side computer 83 which is shown in FIG. 13 and will be described later. The browser unit corresponds to a WWW browser 33 and a display device 24 of the remote side computer 83. The interface unit corresponds to a network interface unit 32 of the remote side computer 83. The control unit corresponds to a slide show processing unit 31 of the remote side computer 83.

In the slide show system of the present embodiments, the following four functions are provided for the presentation to be performed using a WWW browser:

Function 1: instructing a display sequence of the URLs which are registered in a bookmark list, using a slide operation button (manual mode)

Function 2: automatically causing a browser to display a plurality of pages in predetermined sequence and intervals using the URLs registered in a bookmark list (automatic mode)

Function 3: automatically generating background music (BGM) and a narration

Function 4: after downloading a web page to be displayed at a slide show, storing this page as a local file, and executing the above-mentioned Functions 1 and 2 using this local file By being provided with the manual mode of Function 1, a user can perform a presentation manually switching pages like the performance of a slide show. Further, by being provided with the automatic mode of Function 2, a user can automatically switch pages without performing manual operations. Therefore, a user can concentrate on the explanation of displayed information.

Further, by being provided with Function 3, more effective presentation can be performed, and a narration can act as necessary explanation. Still further, by being provided with Function 4, a browser need not be connected to the Internet at that occasion so that a presentation can refrain from being interrupted by a connection failure.

Figure 2B:
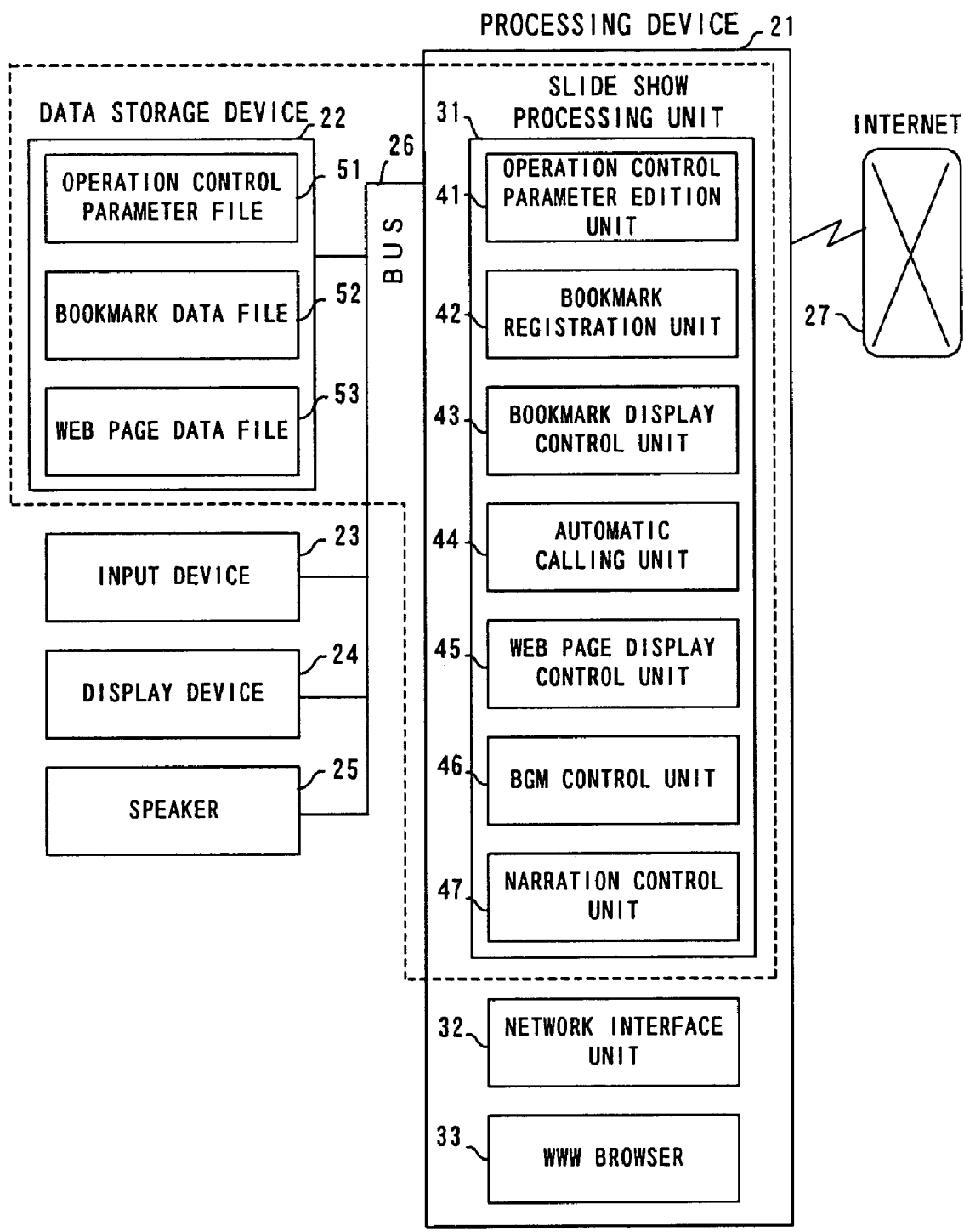
FIG. 2B is a diagram showing the configuration of the slide show system.

FIG. 2B is a configuration diagram showing a slide show system of the present embodiment. The slide show system shown in FIG. 2B is composed of a processing device 21, a data storage device 22, an input device 23, a display device 24, and a speaker 25. These devices are connected to each other via a bus 26.

The input device 23 corresponds to a pointing device such as a keyboard, a mouse or the like, or a touch panel and inputs instructions and data transmitted from a user to the programs executed by the processing device 21. The display device 24 corresponds to, for example, a CRT (cathode ray tube) display, and displays a screen of questions made from a program to the user, processing results, a web page, or the like.

The processing device 21 consists of a slide show processing unit 31, a network interface unit 32, and a WWW browser 33, and is connected to the Internet 27 via the network interface unit 32. An arbitrary method such as a dial-up connection to be performed via a public line, an exclusive line connection using an exclusive line or the like is used as a connection method.

Here, the slide show processing unit 31 and the data storage device 22 (parts encircled by a dotted line) of the processing device 21 mainly perform the above-mentioned functions 1 to 4 of the slide show system. The slide show processing unit 31 includes an operation control parameter edition unit 41, a bookmark registration unit 42, a bookmark display control unit 43, an automatic calling unit 44, a web page display control unit 45, a BGM control unit 46, and a narration control unit 47. The data storage unit 22 stores an operation control parameter file 51, a bookmark data file 52, and a web page data file 53.

The slide show processing unit 31 corresponds to software components described by programs, and expands the function of the WWW browser 33 by being included as a function of the WWW browser 33, or being provided as in-line or plug-in software.

The operation control parameter file 51 stores various kinds of control parameters which are required for the operation of the slide show system. The bookmark data file 52 stores information such as the title of a page registered as a bookmark, the URL or the like. The web page data file 53 stores information of the pages which are downloaded from a WWW server, in order to use this information for the slide show.

The operation control parameter edition unit 41 sets various kinds of control parameters in the operation control parameter file 51, and also has a function of changing these parameters. When a user instructs the registration of a bookmark, the bookmark registration unit 42 stores the information of the pages displayed by the WWW browser 33 in the bookmark data file 52. The bookmark display control unit 43 displays the thus-registered bookmark on a screen of the display device 24 according to the contents of the bookmark data file 52.

The automatic calling unit 44 automatically activates the web page display control unit 45, the BGM control unit 46, and the narration control unit 47, according to the contents of the operation control parameter file 51, and supplies necessary control parameters to these control units 45, 46, and 47.

The web page display control unit 45 reads the URL of a bookmark which is registered in the bookmark data file 52, according to the instructions of the automatic calling unit 44, and informs the thus-read URL to the WWW browser 33. The WWW browser 33 accesses the Internet 27 via the network interface unit 32 using the thus-informed URL or accesses the web page data file 53 using the thus-informed URL. Then, the web page display control unit 45 obtains information of the corresponding page and causes the display device 24 to display this information.

The BGM control unit 46 outputs predetermined BGM from the speaker 25 according to the instructions of the automatic calling unit 44. The narration control unit 47 outputs a predetermined narration from the speaker 25 according to the instructions of the automatic calling unit 44.

Figure 1:
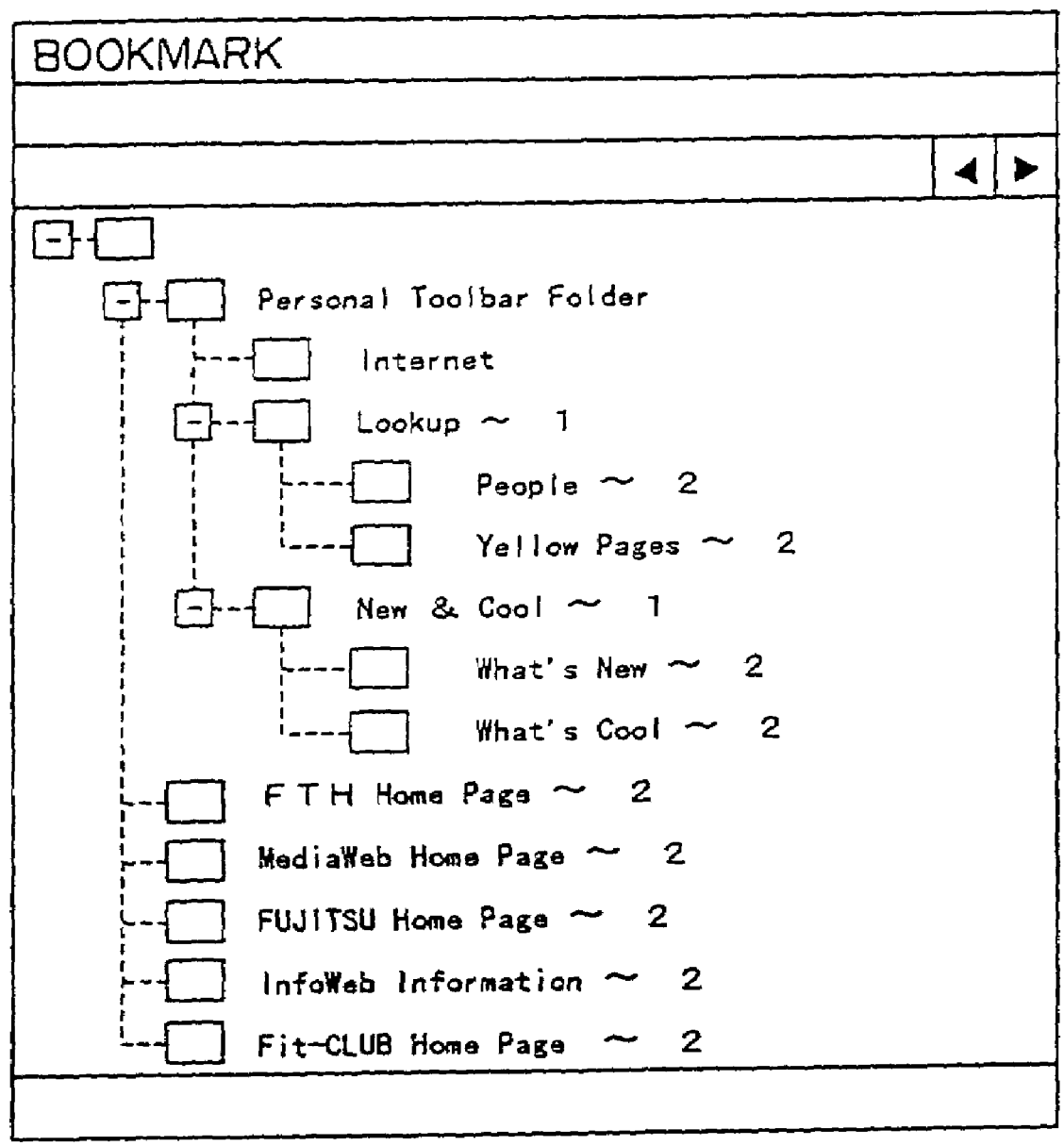
FIG. 1 is a diagram showing a conventional bookmark display screen.

In this slide show system, an image display bookmark system (Japanese patent application No. 9-264478) which can be more easily handled, can be used other than a conventional bookmark system shown in FIG. 1. According to this image display bookmark system, the image of an actual web page is obtained, and data (an image icon) in which the image is made to be an icon, are registered as a bookmark. A user can easily access his or her desired page by clicking a bookmark which is displayed as an image icon.

Figure 3:
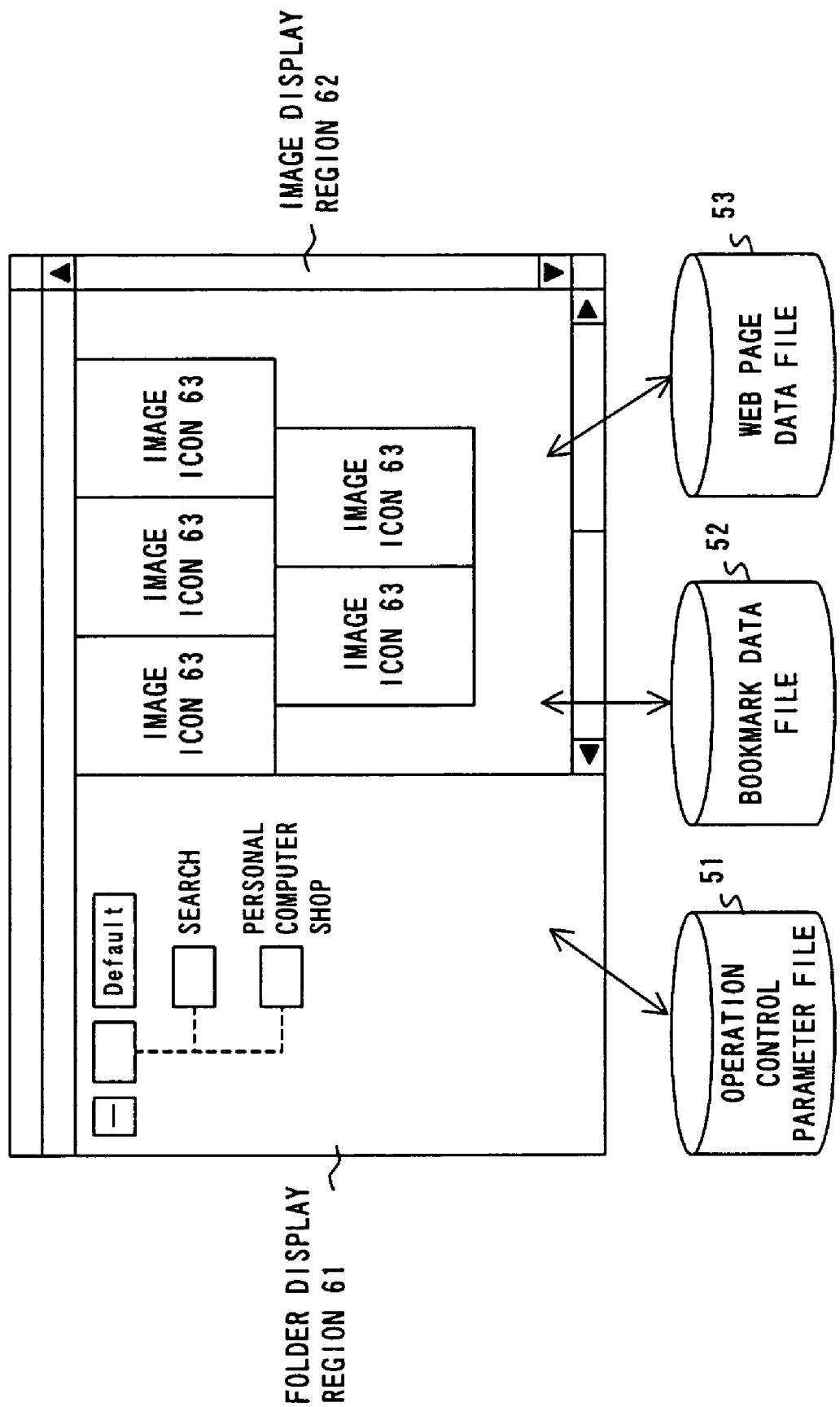
FIG. 3 is a diagram showing a bookmark page.

FIG. 3 shows the display screen of a bookmark page using such an image icon system. This screen is displayed in such a way that a user performs an operation of displaying the edition screen of a bookmark from the WWW browser 33 or that a user performs an operation of easily displaying a bookmark using a pop-up window. This screen includes a folder display region 61 and an image display region 62.

In the folder display region 61, several folders for storing a plurality of registered bookmarks are displayed, and generally a bookmark belonging to a single category is stored for each folder. In the image display region 62, a list of image icons 63 corresponding to the respective bookmarks in a folder which is selected by a user is displayed. Each of the image icons 63 is prepared by reducing the image of a web page corresponding to each bookmark.

According to this example, a folder such as "Default" is selected by a user, and five image icons 63 corresponding to the five bookmarks in this folder are displayed. The folder "Default" also includes two folders such as "search" and "personal computer shop" in addition to these five bookmarks.

By selecting these folders in the folder display region 61, a user can display the image icons 63 of bookmarks stored in these folders. By selecting an image icon 63 in the image display region 62, a page, the URL of which is registered in a corresponding bookmark, is automatically accessed to be displayed on a screen.

The slide show processing unit 31 shown in FIG. 2B can select a bookmark instead of a user and using the operation control parameter file 51, the bookmark data file 52, and the web page data file 53 which correspond to a bookmark page, and further can inform the URL of the thus-selected bookmark to the WWW browser 33.

Figure 4:
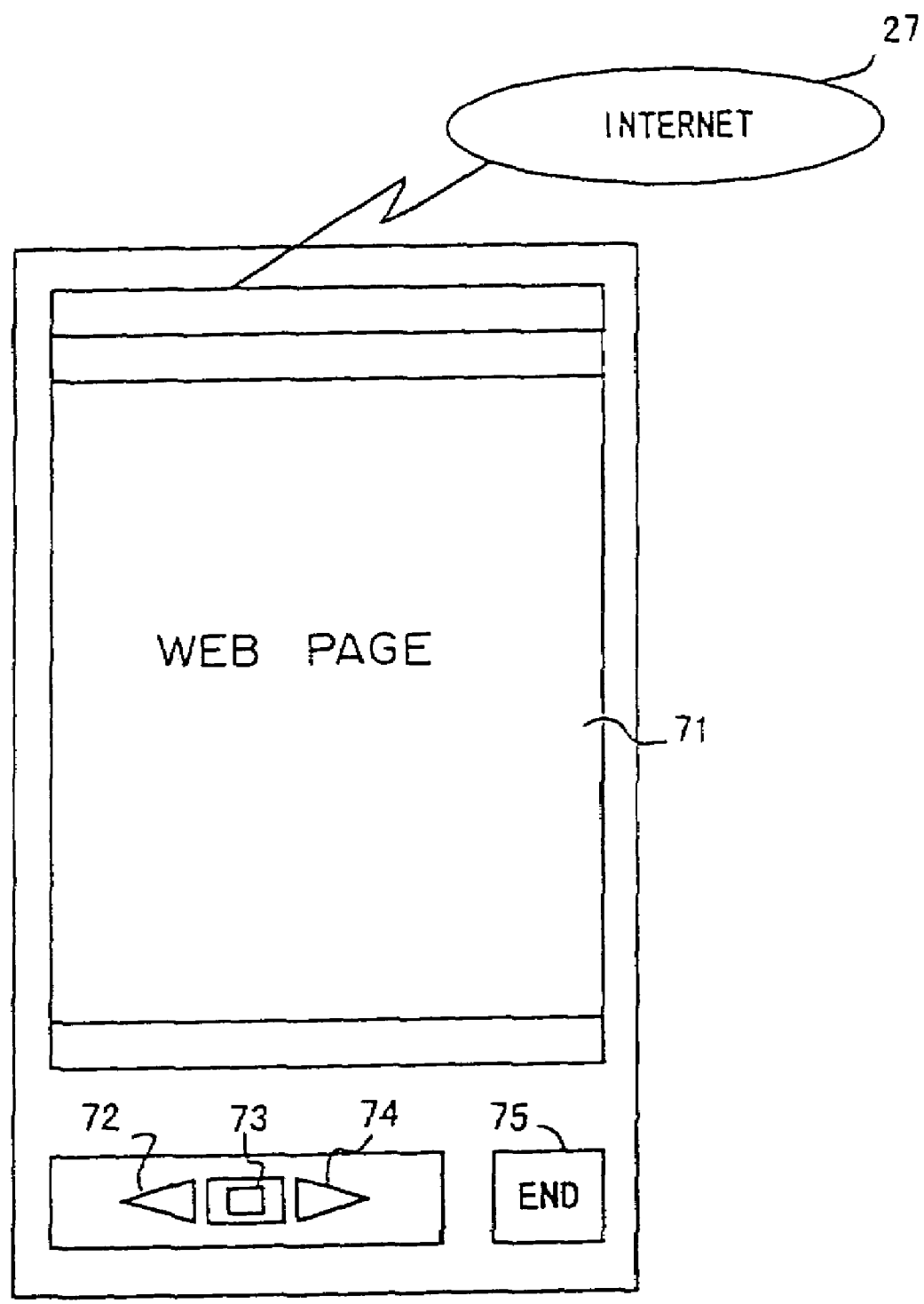
FIG. 4 is a diagram showing a slide show screen.

FIG. 4 shows an example of the slide show screen to be displayed by the slide show system shown in FIG. 2B. This screen includes a web page 71, slide operation buttons 72, 73, and 74, and a termination button 75 (END).

A series of display sequence numbers is supplied to bookmarks to be used for the slide show. When a user pushes a reverse transmission button 72 in a manual mode, a page corresponding to a display sequence number which immediately precedes the currently displayed page, is displayed. When a user pushes a next transmission button 74, a page corresponding to a display sequence number which immediately follows the currently displayed page, is displayed. Here, the display sequence number represents a sequence for displaying the results obtained by accessing a WWW server when a plurality of pages are to be displayed. A pushing process of the button on a screen means an operation of clicking the button using a mouse or the like.

The termination button 75 is used when terminating a slide show in the manual mode. The stop button 73 is used for temporarily stopping the switching of pages in an automatic mode.

Here, operation buttons 72, 73, 74, and 75 are displayed on a screen, and a user clicks these buttons. However, these input operations can be performed according to an arbitrary method instructed from an arbitrary input device. For example, these operation functions can correspond to specific keys on a keyboard.

In the operation control parameter file 51, data such as shown in FIG. 5 are stored. In FIG. 5, AUTO corresponds to a flag indicating whether or not a display is performed in an automatic mode. When AUTO=Yes, an automatic mode is activated. When AUTO=No, a manual mode is activated.

MAXNUM is a parameter indicating the maximum value of a series of display sequence numbers. WAIT(i) is a parameter indicating a display time period of the page corresponding to a display sequence number i (i=1, 2, ..., MAXNUM). This display time period corresponds to a time interval between the display of a current page and that of the next page. Here, these parameters are set as follows: MAXNUM=20, and WAIT(i)=60 (seconds)

BGM(i) corresponds to a flag indicating whether or not BGM is played when a page corresponding to the display sequence number i is displayed. When BGM(i)=Yes, BGM is played. When BGM(i)=No, BGM is not played. BGM_FILE(i) is a parameter indicating a file name of a file which stores the sound data of BGM to be played when a page corresponding to the display sequence number i is displayed. Here, this parameter is set to BGM_FILE(i)=song.avi.

NARRATION(i) corresponds to a flag indicating whether or not a narration is played back when a page corresponding to the display sequence number i is displayed. When NARRATION(i)=Yes, a narration is played back. When NARRATION(i)=No, a narration is not played back. NARRATION_FILE(i) is a parameter indicating the file name of a file which stores the sound data of a narration to be played back when a page corresponding to the display sequence number i is displayed. Here, this parameter is set to NARRATION FILE(i)=nal.avi.

As WAIT(i), BGM(i), BGM FILE(i), NARRATION(i), and NARRATION_FILE(i), different data can be set for each display sequence number i. The files of BGM and a narration are stored in, for example, the data storage device 22 shown in FIG. 2B.

Further, for example, data as shown in FIG. 6 are stored in the bookmark data file 52. In FIG. 6, each set of bookmark data is composed of items such as "title", "URL", "image file name", "comment", "coordinate value", and "display sequence number".

In a column "title", the title data of a web page corresponding to each set of bookmark data are stored. In a column "URL", a URL of the web page is stored. A URL is generally described using a character string "http:" indicating an access destination on the Internet. When the access destination is data stored in the web page data file 53, the URL is described using the character string "file:" indicating a local file.

In a column "image file name", the file name of an image icon 63 shown in FIG. 3 is automatically named in order to be unique in a system, and the thus-named file name is stored. A "comment" column is used for a user to write a suitable comment. In a "coordinate value" column, the coordinate value of a position indicating the image icon 63 on a screen shown in FIG. 3 is stored. In a "display sequence number", a display sequence number specified by a user or a system is stored. The user can change this display sequence number via the bookmark display control unit 43.

Thus, the bookmark data file 52 stores a correspondence relationship between the URL of a web page of each bookmark and a display sequence number. Therefore, the URL of a web page corresponding to the current display sequence number can be obtained by referring to the bookmark data file 52.

Next, display operations performed by the slide show system shown in FIG. 2B will be explained with reference to FIG. 7 to FIG. 11.

FIG. 7 is a flowchart showing the display control processing performed by the slide show processing unit 31. First, the automatic calling unit 44 reads the operation control parameter file 51 from the data storage device 22 (step S1), and checks the value of a flag AUTO (step S2). When AUTO=Yes, an automatic mode is activated, and automatic processing is performed (step S3). The details of this automatic processing will be explained later.

When AUTO=No, a manual mode is activated, and 0 is set to the control variable i indicating a display sequence number (step S4). Then, it is determined which button shown in FIG. 4 a user has pushed (step S5). When the user pushed the reverse transmission button 72, −1 is set to the variable Index indicating a difference of the display sequence number (step S6). When the user pushed the next transmission button 74, 1 is set to the variable Index (step S7). A value obtained adding the Index to the display sequence number is re-set as i, and the value of i is checked (step S9).

When $i \leq 0$, no display sequence numbers are present. Accordingly, it is set that i=0 (step S10), and processes in and after step S5 are repeated. When i>MAXNUM, no display sequence numbers corresponding to this value are present. Accordingly, it is set that i=MAXNUM (step S11), and processes in and after step S5 are repeated.

In the case of $0<i \leq MAXNUM$, the value of a flag BGM(i) corresponding to the regeneration number i is checked (step S12). When BGM(i)=Yes, the BGM control unit 46 is activated, and the file name which is set in a BGM_FILE(i) is supplied to the unit 46.

The BGM control unit 46 reads a BGM file corresponding to the thus-received file name (step S13), plays the sound data (step S14), and returns the control to the automatic calling unit 44. Then, the automatic calling unit 44 repeats processes in and after step S15. When BGM(i)=No, processes in after step S15 are performed without activating the BGM control unit 46.

In step S15, the automatic calling unit 44 checks the value of a flag NARRATION(i) corresponding to the display sequence number i. When NARRATION(i)=Yes, the narration control unit 47 is activated, and the file name which is set in a NARRATION_FILE(i) is supplied to the unit 47.

The narration control unit 47 reads a narration file corresponding to the thus-received file name (step S16), played back the sound data (step S17), and returns the control to the automatic calling unit 44. Then, the automatic calling unit 44 repeats processes in and after step S18. When NARRATION(i)=No, processes in after step S18 are performed without activating the narration control unit 47.

In step S18, the automatic calling unit 44 activates the web page display control unit 45, and instructs this unit 45 to display a web page corresponding to the display sequence number i. The web page display control unit 45 reads the URL of a bookmark of the display sequence number i from the bookmark data file 52 (step S18), informs this URL to the WWW browser 33 (step S19), and returns the control to the automatic calling unit 44.

Then, the automatic calling unit 44 repeats processes in and after step S5. When a user pushes the termination button 75, processing in a manual mode is terminated.

Figure 8:
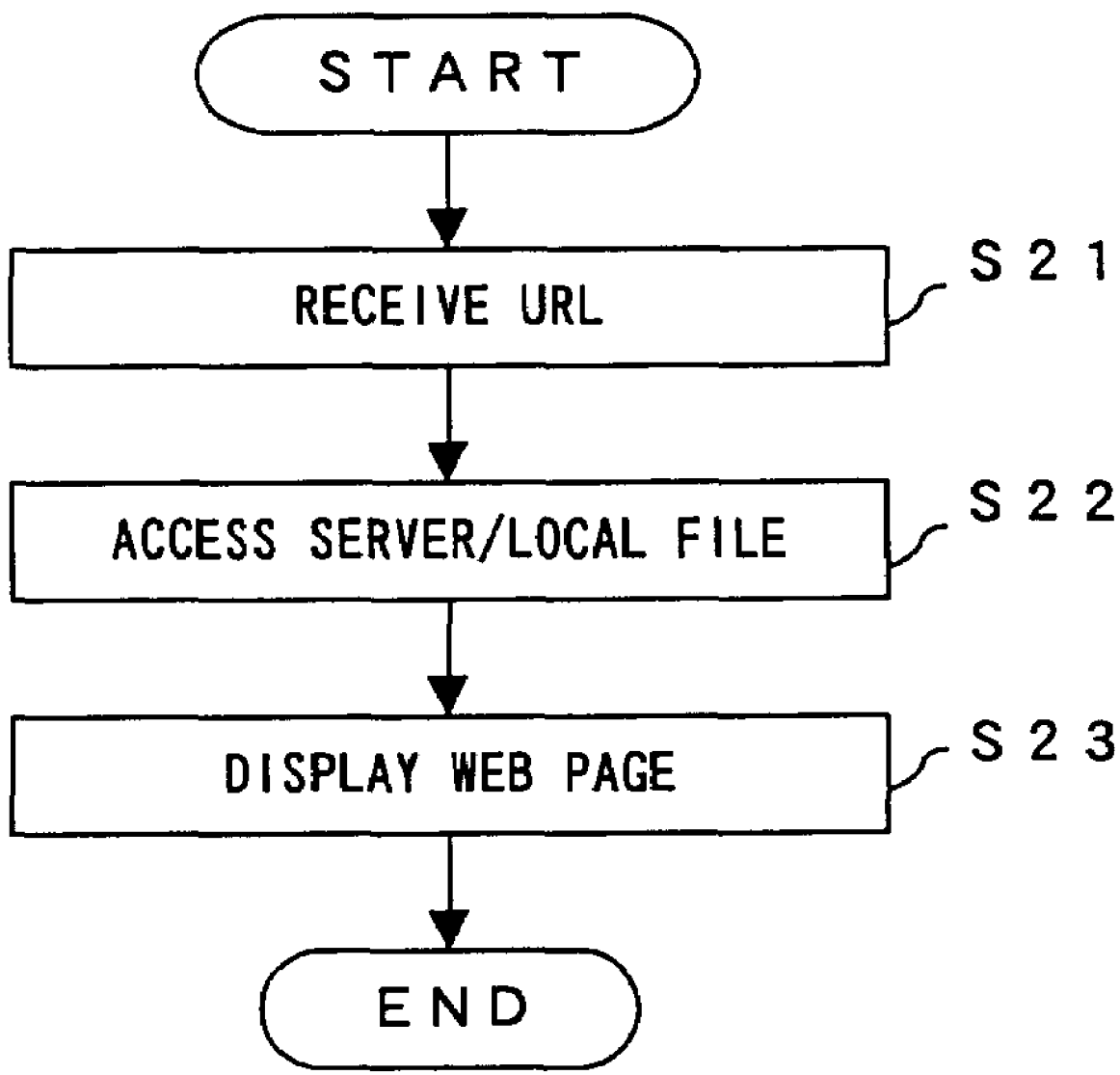
FIG. 8 is a flowchart showing processing to be performed by a browser.

In step S19 shown in FIG. 7, the WWW browser 33 to which a URL is informed performs display processing as shown in FIG. 8. The WWW browser 33 receives the URL from the web page display control unit 45 (step S21), and accesses a WWW server or a local file stored in the web data file 53 which stores the web page (step S22).

Here, in the case where the URL starts with "http:", a WWW server provided on the Internet 27 is accessed. In the case where the URL starts with "file:" the web page data file 53 is accessed. When information of the web page is obtained, this information is displayed on a screen of the display device 24 (step S23), and processing is terminated.

When the web page display control unit 45 informs the URL to the WWW browser 33, a function of communicating between applications such as a DDE (dynamic data exchange) can be used.

The DDE is a kind of communication between processes, and exchanges data between applications using a shared memory. The application software provided on a transmission side can use the DDE for the real-time data exchange in the case where data are transferred only once or where the contents of updating processing are transmitted to the application software provided on a reception side when new data are available. Further, the DDE is automatically performed between applications without involving a user.

Figure 9:
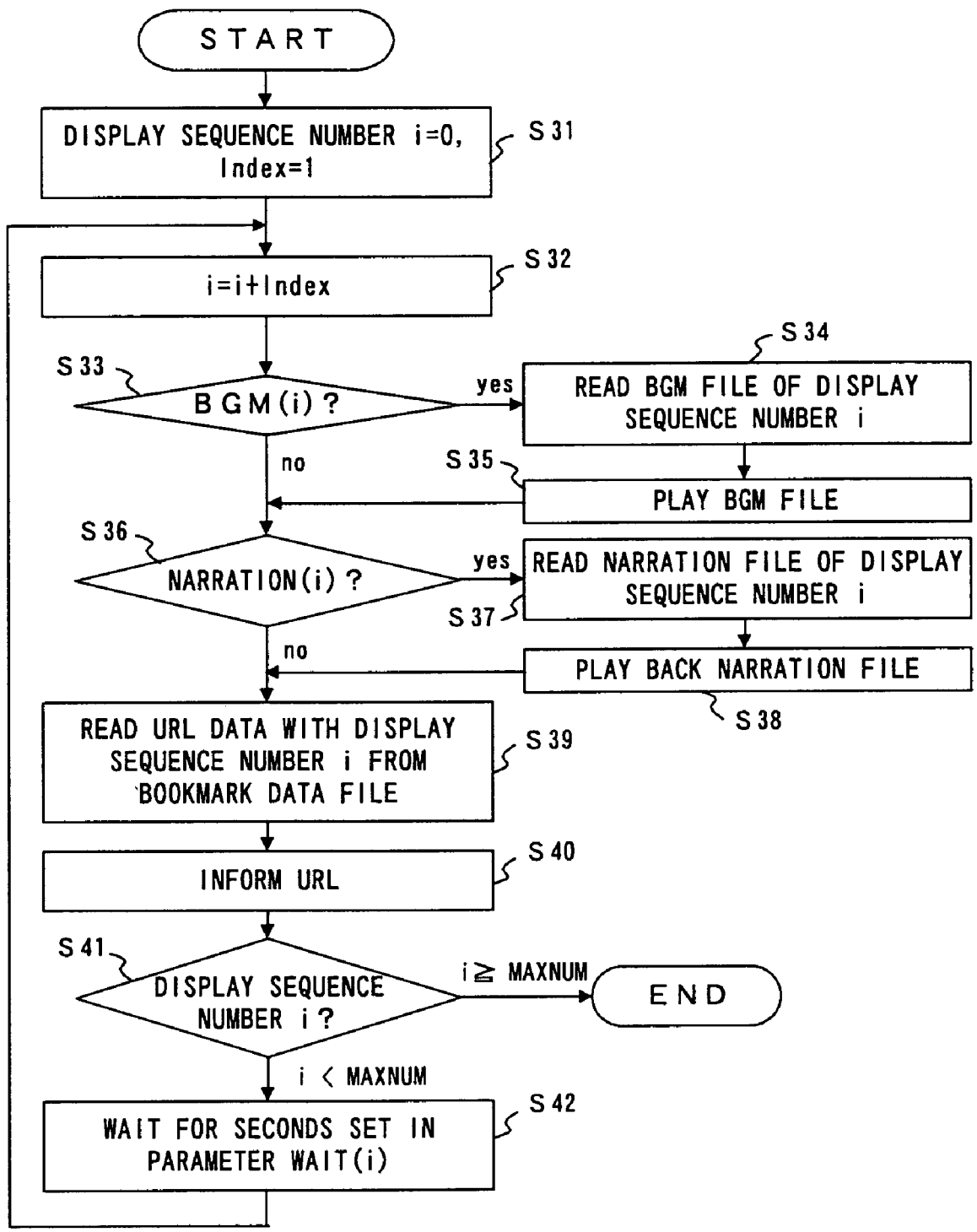
FIG. 9 is a flowchart showing first automatic processing.

In step S3 shown in FIG. 7, the automatic calling unit 44 performs automatic processing as shown in FIG. 9. First, the automatic calling unit 44 sets a control variable i indicating a display sequence number to 0, and sets a variable Index indicating a difference of the display sequence number to 1 (step S31). Next, a value obtained by adding Index to the display sequence number i is re-set as i (step S32), and the processes in and after S33 are performed.

Here, the processes to be performed in steps S33 to S40 are the same as those performed in steps S12 to S19 shown in FIG. 7. The processing to be performed by the WWW browser 33 to which a URL is informed in step S40 is the same as that shown in FIG. 8.

Next, the automatic calling unit 44 checks a value of the display sequence number i (step S41). When i<MAXNUM, the automatic calling unit 44 waits for a time period which is set in WAIT(i) (step S42), and repeats the processes in and after step S32. When i reaches MAXNUM, no display sequence numbers greater than i are present, and accordingly the automatic processing is terminated.

When a user pushes the stop button 73 while the automatic processing is being operated, which is not specifically shown in FIG. 9, the automatic calling unit 44 can temporarily stop the display operation of the next page without regard to a time period which is set in the WAIT(i). In this case, the next transmission button 74, for example, is used for re-starting the display operations. When a user pushes the termination button 75, the automatic calling unit 44 can terminate the automatic processing. Thus, according to the display control processing in an automatic mode, a display sequence number is automatically incremented without a user pushing the operation buttons 72 and 74 so that a slide show is performed. Further, different BGM and different narrations can be played back for each web page to be displayed so that various kinds of slide shows can be performed.

In the above-mentioned embodiments, a different display interval, a different BGM file, and a different narration file are used for each display sequence number. When automatic processings are to be more easily performed, the same display interval, the same BGM file, and the same narration file can be used.

FIG. 10 shows the data of the operation control parameter file 51 to be used for this automatic processing. In FIG. 10, the flag AUTO and the parameter MAXNUM is the same as the operation control parameter file 51 shown in FIG. 5.

A parameter WAIT indicates the display time period of a page which is common to all the display sequence numbers in an automatic mode. A flag BGM indicates whether or not BGM which is common to all the display sequence numbers is played. A parameter BGM_FILE indicates the file name of a file which stores sound data of the BGM. A flag NARRATION indicates whether or not a narration which is common to all the display sequence numbers is played back. A parameter NARRATION FILE indicates the file name of a file which stores sound data of the narration.

Figure 11:
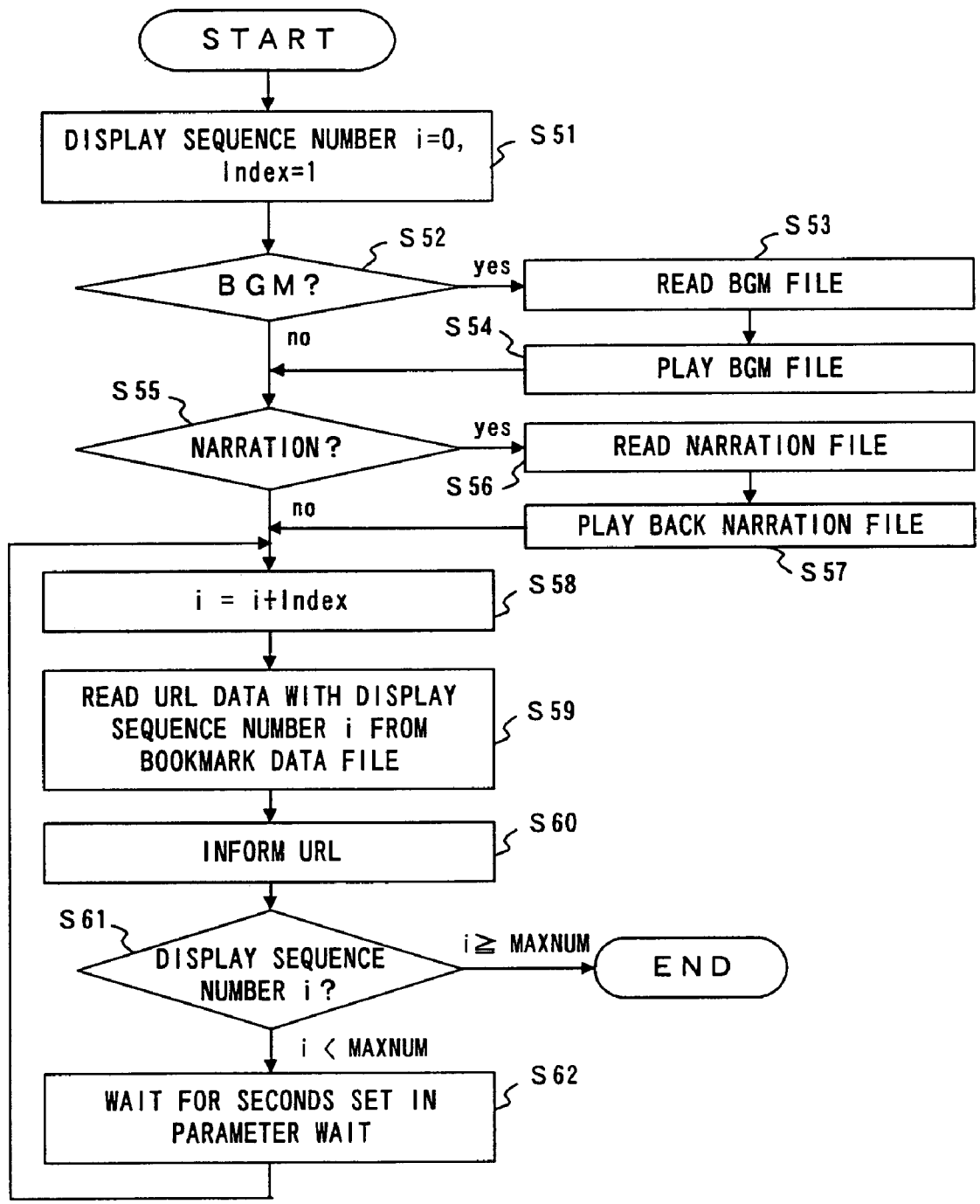
FIG. 11 is a flowchart showing second automatic processing.

When the operation control parameter file 51 shown in FIG. 10 is used, the automatic calling unit 44 performs automatic processing as shown in FIG. 11, in step S3 of FIG. 7. First, the automatic calling unit 44 sets a control variable i to 0 which indicates a display sequence number, sets a variable Index to 1 which indicates a difference of the display sequence number (step S51), and checks a value of the flag BGM (step S52). If BGM=Yes, the BGM control unit 46 is activated, and a file name which is set in BGM_FILE is supplied to the BGM control unit 46.

The BGM control unit 46 reads a BGM file corresponding to the thus-received file name (step S53), plays the sound data (step S54), and returns the control to the automatic calling unit 44. Then, the automatic calling unit 44 performs the processes in and after step S55. When BGM=No, processes in and after step S55 are performed without activating the BGM control unit 46.

In step S55, the automatic calling unit 44 checks the value of a flag NARRATION. When NARRATION=Yes, the narration control unit 47 is activated, and a file name which is set in the NARRATION_FILE is supplied to the narration control unit 47.

The narration control unit 47 reads a narration file corresponding to the thus-received file name (step S56), plays back the sound data (step S57), and returns the control to the automatic calling unit 44. Then, the automatic calling unit 44 performs the processes in and after step S58. When NARRATION=No, processes in after step S58 are performed without activating the narration control unit 47.

In step S58, the automatic calling unit 44 re-sets a value which is obtained by adding the Index to the display sequence number i, as i, and performs processes in and after step S59. Here, the processes to be performed in steps S59, S60, and S61 are the same as those performed in steps S39, S40, and S41 shown in FIG. 9. A processing to be performed by the WWW browser 33 to which the URL is informed in step S60 is the same as that shown in FIG. 8.

When i<MAXNUM in step S61, the automatic calling unit 44 waits for a time period which is set in WAIT (step S62), and repeats the processes in and after step S58. In step S61, when i reaches MAXNUM, no sequence numbers greater than i are present, and accordingly the automatic processing is terminated.

According to this display control processing, the BGM and the narration are played back without being switched while the slide show is being performed, and only information of web pages is switched. Therefore, it is not necessary to provide a BGM file and a narration file for each web page to be displayed.

If many PCs are made to perform a slide show at the same time on an educational scene, etc., the mechanism for remotely notifying the WWW browsers of respective PCs of a URL is required. The remote slide show system having such a mechanism provides the following three functions for the simultaneous reference of a specified page with the WWW browsers.

Function 5: arranging a window for inputting a URL to a local side computer, notifying one or a plurality of remote side computers of the URL specified in the window, and making browsers display the corresponding page.

Function 6: notifying one or a plurality of remote side computers of a selected URL if a bookmark desired to be referred to is selected from the bookmarks registered to a local side computer, and making the browsers display the corresponding page.

Function 7: notifying one or a plurality of remote side computers of a URL specified among the URLs registered to the bookmarks of a local side computer, and registering the notified URL as a bookmark to the remote side computers.

For example, the local side computer corresponds to a teacher's PC, and the remote side computer corresponds to a student's PC. With the functions 5 and 6, a teacher issues an instruction to students'PCs from his or her own PC, and allows all of the students to simultaneously and surely open a web page with ease.

Additionally, with the function 7, bookmark data can be easily delivered from a local to a remote side. Accordingly, a teacher can reduce the load of setting the bookmark data in each computer with a medium such as a floppy disk, etc.

Furthermore, this remote slide show system provides the following three functions for a simultaneously performed slide show.

Function 8: instructing the display sequence of URLs registered as bookmarks with a slide operation button of a local side computer, notifying one or a plurality of remote side computers of the URLs in the instructed sequence, and making the browsers display the corresponding pages (manual mode).

Function 9: automatically notifying one or a plurality of remote side computers of a plurality of URLs in a predetermined sequence at predetermined intervals by using the URLs registered as the bookmarks to a local side computer, and making the browsers automatically display the corresponding pages (automatic mode).

Function 10: downloading web pages to be targeted as a slide show into one or a plurality of remote side computers, making the computers store the downloaded pages as local files, and making the computers execute the above described functions 5, 6, 8, and 9 by using the local files.

With the manual mode of the function 8, a teacher can give a lesson while manually switching the pages displayed by one or more remote side computers.

Additionally, with the automatic mode of the function 9, pages can be automatically switched without any manual operations. Accordingly, it becomes possible to make a remote side computer easily and surely display necessary pages, and beside, it becomes unnecessary to prepare bookmark data on the remote side computer.

Furthermore, with the function 10, a browser no longer need to make a connection to the Internet on the spot, thereby preventing a lesson or lecture from being suspended due to an unsuccessful connection.

Figure 12:
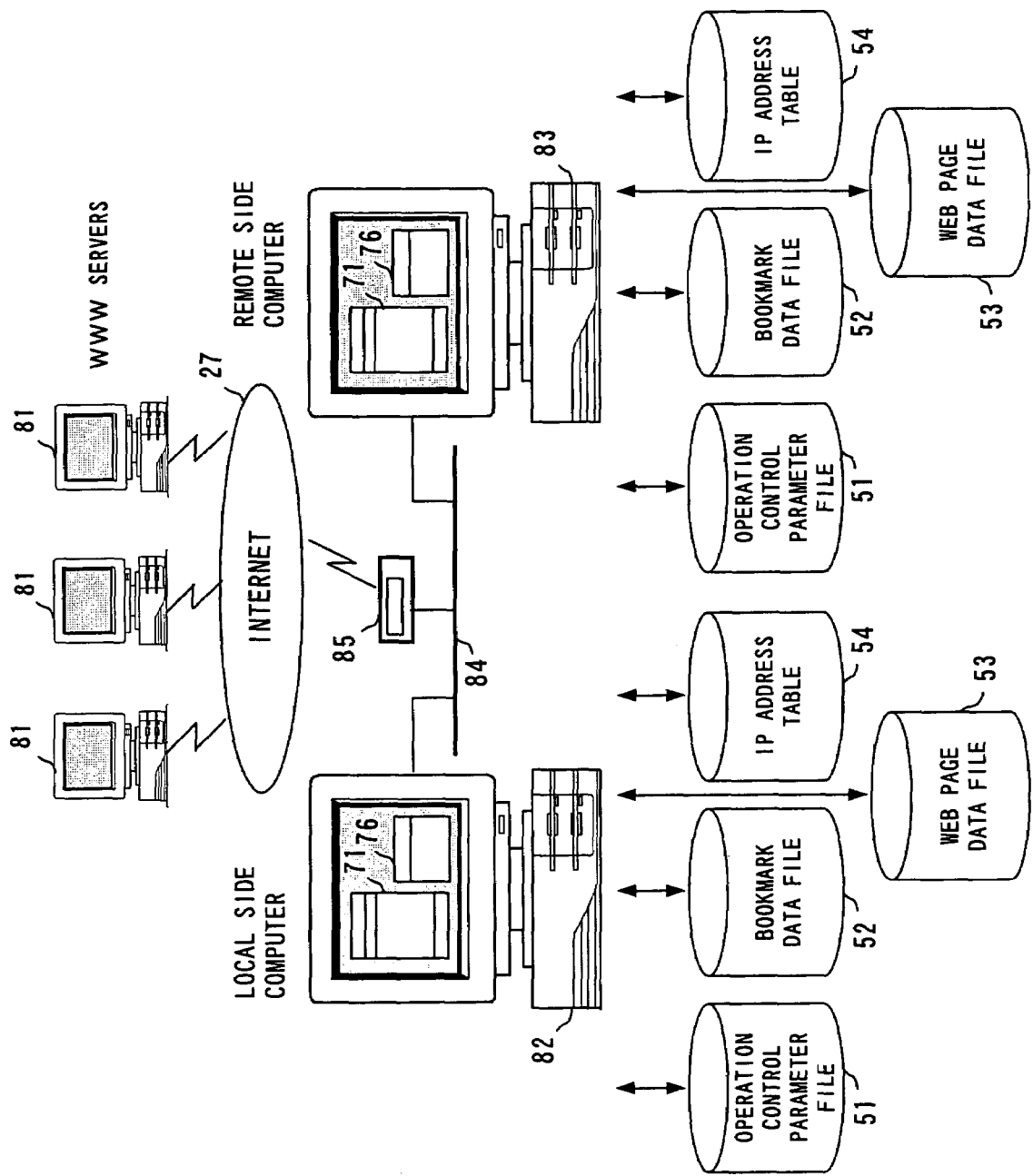
FIG. 12 is a diagram showing the configuration of a remote slide show system.

FIG. 12 is a diagram showing the configuration of such a remote slide show system. The remote slide show system shown in this figure comprises the Internet 27, WWW servers 81, a local side computer 82, one or more remote side computers 83, a LAN (Local Area Network) 84, and an Internet connecting device 85.

The local side computer 82 and the remote side computer 83 are interconnected by the LAN 84, and access the WWW servers 81 on the Internet 27 via the Internet connecting device 85. For example, a router is used as the Internet connecting device.

Each of the computers stores the above described operation control parameter file 51, bookmark data file 52, and web page data file 53, and displays the web page 71 and the bookmark menu 76. Additionally, each of the computers stores an IP (Internet Protocol) address table 54 storing IP addresses, and controls the transmission/reception of page display notification and bookmark data registration notification while referring to the contents of the IP address table 54.

FIG. 13 is a diagram showing the configurations of the local side computer 82 and the remote side computer 83, which are shown in FIG. 12. In a similar manner as in the system shown in FIG. 2B, each of the computers comprises the processing device 21, the data storage device 22, the input device 23, and the display device 24, which are interconnected by the bus 26.

The processing device 21 comprises the above described slide show processing unit 31, network interface unit 32, and WWW browser 33. Here, the slide show processing unit 31 and the data storage device 22 within the processing device 21 (portions enclosed by broken lines) mainly execute the above described functions 5 through 10 of the remote slide show system.

The slide show processing unit 31 comprises an IP address table edition unit 48 in addition to the above described operation control parameter edition unit 41, bookmark registration unit 42, bookmark display control unit 43, automatic calling unit 44, and web page display control unit 45. The data storage device 22 stores the operation control parameter file 51, the bookmark data file 52, the web page data file 53, and the IP address table 54.

The IP address table edition unit 48 has a capability for setting the IP address of a communication destination computer and respective flag types in the IP address table 54, and for changing them.

The slide show processing unit 31 on the local side can select a bookmark instead of a teacher by using the operation control parameter file 51, the bookmark data file 52, the web page data file 53, and the IP address table 54, and can notify the WWW browser 33 on the remote side of the URL of the selected bookmark. The operation buttons shown in FIG. 4 are displayed on the screen of the display device 24 on the local side. These buttons are operated by a teacher.

In the operation control parameter file 51, for example, data shown in FIG. 14 are stored. In FIG. 14, S_PUSH corresponds to a flag indicating whether or not (Yes or No) a local side can issue a display instruction to a remote side, and S_ACCEPT corresponds to a flag indicating whether or not (Yes or NO) the remote side accepts the display instruction issued from the local side.

Additionally, B_PUSH corresponds to a flag indicating whether or not (Yes or No) the local side can issue a bookmark data registration instruction to the remote side. B_ACCEPT corresponds to a flag indicating whether or not (Yes or No) the remote side accepts the bookmark data registration instruction issued from the local side. AUTO, MAXNUM, and WAIT(i) are similar to those shown in FIG. 5.

In the bookmark data file 52, for example, the data shown in FIG. 6 are stored. Here, the display sequence number shown in FIG. 6 corresponds to the URL notification sequence notified from the local to the remote side in the automatic mode.

Furthermore, in the IP address table 54, for example, data shown in FIG. 15 are stored. In this figure, an IP address is address information of each computer in a system. For the local side computer 82 which issues a processing instruction, the IP address of a student's machine represents the IP address of a processing target. For the remote side computer 83 which receives the processing instruction, the IP address of a teacher's machine represents the IP address of an instruction issuing source.

Still further, S_FLAG_S corresponds to a flag indicating whether or not (ON or OFF) a corresponding computer performs page display notification, while S_FLAG_R corresponds to a flag indicating whether or not (ON or OFF) a corresponding computer accepts the page display notification.

B_FLAG_S corresponds to a flag indicating whether or not (ON or OFF) a corresponding computer performs bookmark data registration notification, while B_FLAG_R corresponds to a flag indicating whether or not (ON or OFF) a corresponding computer accepts the bookmark data registration notification. A comment is a comment statement for a corresponding computer, and is added to facilitate the identification of an IP address.

Here, for the IP address of the local side computer 82 being a teacher's machine, S_FLAG_S=OFF, S_FLAG_R=ON, B_FLAG_S=OFF, and B_FLAG_R=ON are set. For the IP address of the remote side computer 83 being a student's machine, S_FLAG_S=ON, S_FLAG_R=OFF, B_FLAG_S=ON, and B_FLAG_R=OFF are set.

Fundamentally, the same information is registered to the IP address table 54 of each computer. However, only the IP address of a required communication destination may be selectively registered.

Next, the display and the registration operations performed by the remote slide show system shown in FIG. 13 are explained by referring to FIGS. 16 through 23.

Figure 16:
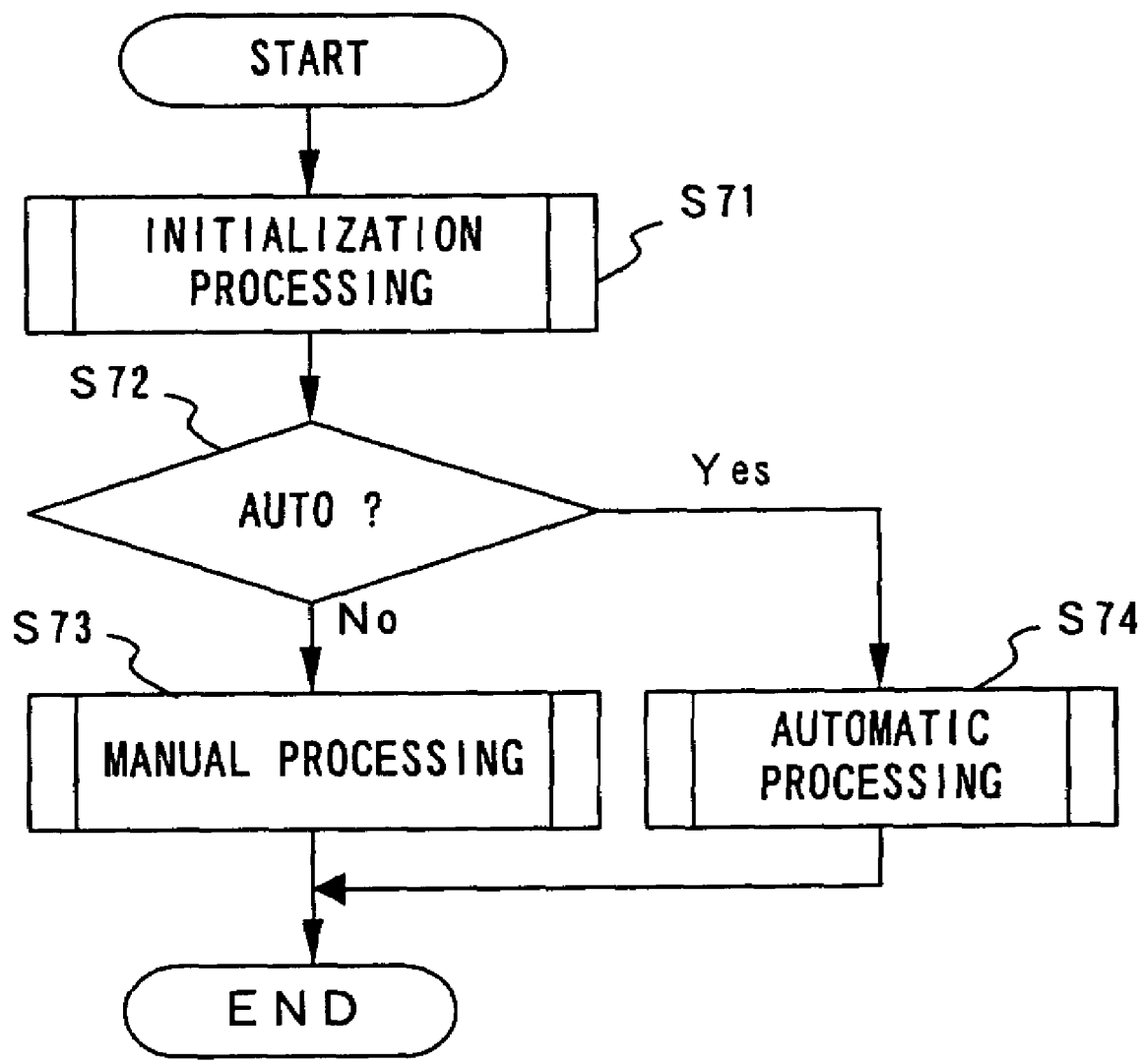
FIG. 16 is a flowchart showing display control processing on a local side.
Figure 17:
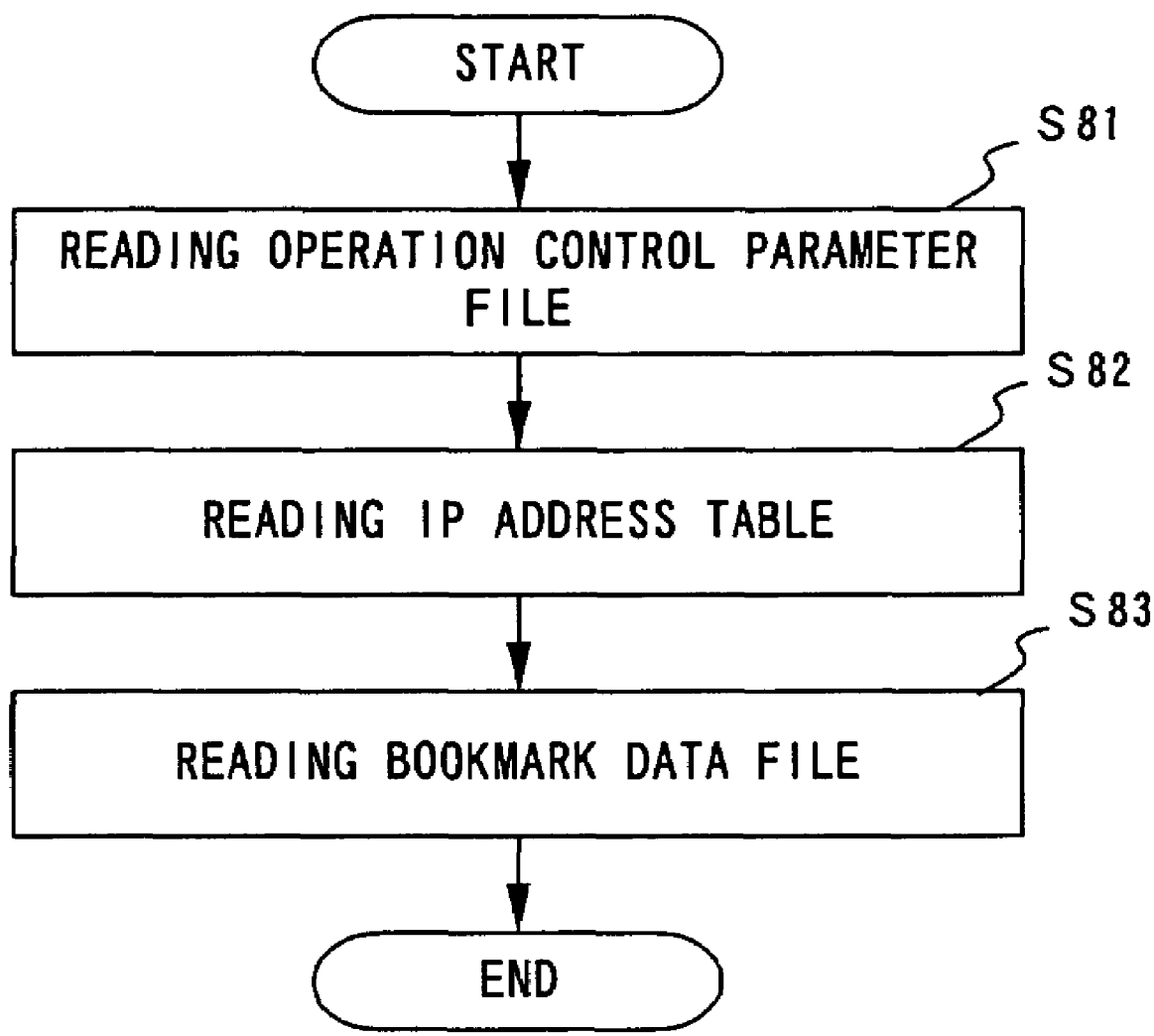
FIG. 17 is a flowchart showing initialization processing.

FIG. 16 is a flowchart showing the display control processing performed by the slide show processing unit 31 on the local side. The slide show processing unit 31 performs initialization processing shown in FIG. 17 (step S71). Here, the automatic calling unit 44 reads the operation control parameter file 51 from the data storage device 22 (step S81), reads the IP address table 54 (step S82), and reads the bookmark data file 52 (step S83).

Next, the automatic calling unit 44 examines the value of the flag AUTO in the operation control parameter file 51 (step S72). If AUTO=No, the automatic calling unit 44 activates a manual mode, performs manual processing (step S73), and terminates the processing. If AUTO=Yes, the automatic calling unit 44 activates an automatic mode, performs automatic processing (step S74), and terminates the processing.

Figure 18:
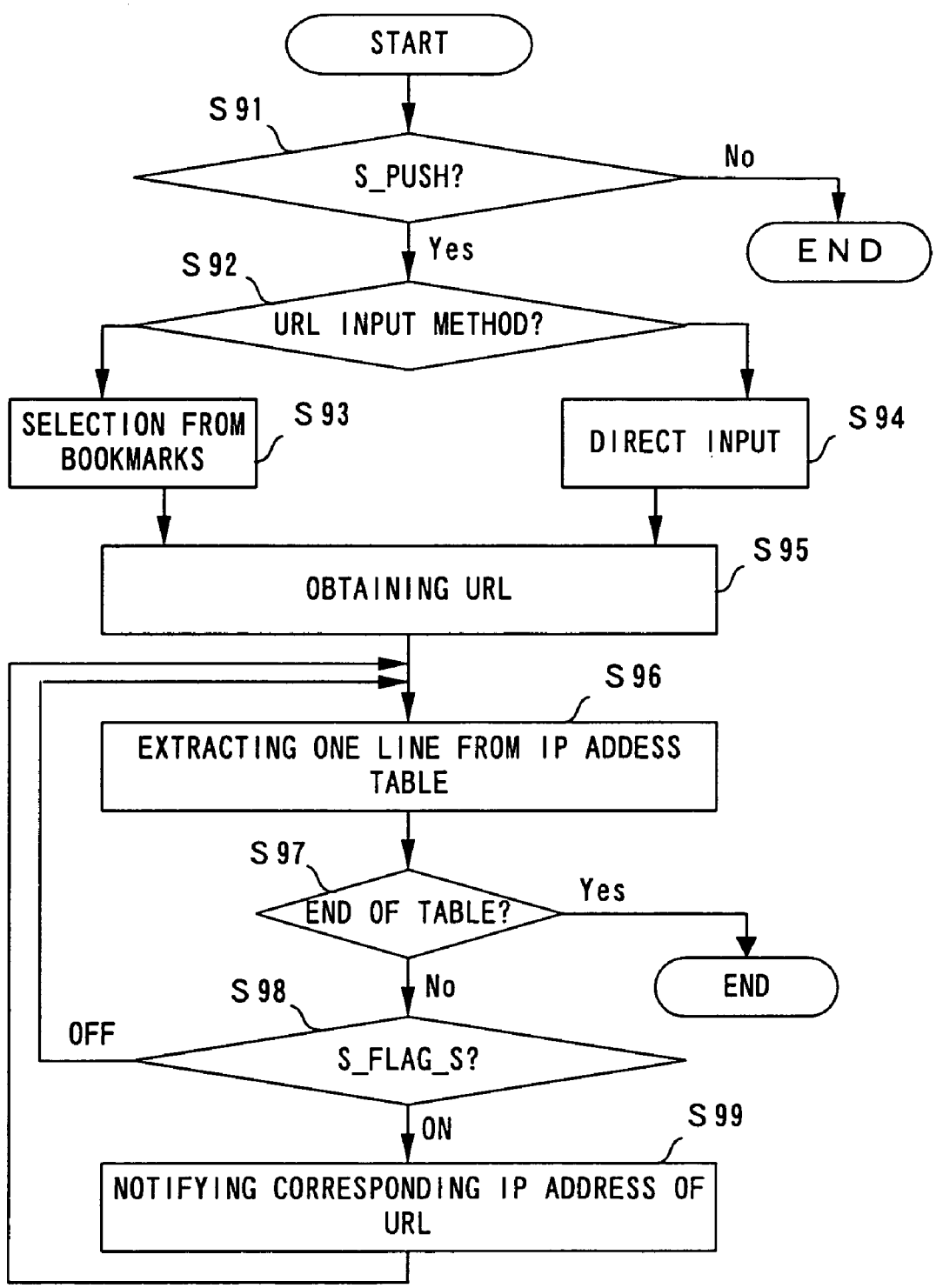
FIG. 18 is a flowchart showing manual processing on the local side.

FIG. 18 is a flowchart showing the manual processing performed in step S73 of FIG. 16. In the manual processing, the automatic calling unit 44 examines the value of the flag S_PUSH in the operation control parameter file 51 (step S91). If S_PUSH=No, the automatic calling unit 44 terminates the processing.

Figure 19:
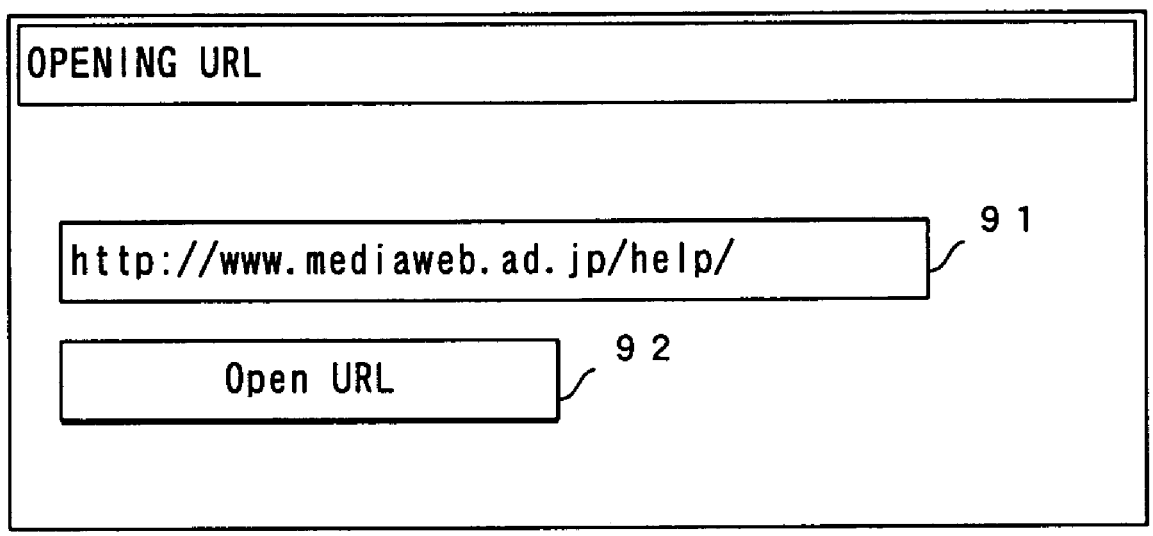
FIG. 19 is a diagram showing a URL input screen.

If S_PUSH=Yes, the automatic calling unit 44 determines a URL input method used by a teacher (step S92). If a URL is selected from the bookmark menu 76 shown in FIG. 12 (step S93), the automatic calling unit 44 obtains the URL of the selected bookmark (step S95). If the URL is directly input (step S94), the automatic calling unit 44 obtains the input URL (step S95). In step S94, for example, the input window shown in FIG. 19 is displayed. Then, a teacher inputs the URL to a box 91 and presses a button 92, so that the input URL is obtained.

Next, the automatic calling unit 44 extracts the data of one line from the IP address table 54 (step 96), and examines whether or not the extracted data indicates the end of the IP address table 54 (step S97). If the extracted data does not indicate the end, the automatic calling unit 44 examines the value of the flag S_FLAG_S included in that data (step S98).

If S_FLAG_S=ON, the automatic calling unit 44 instructs the network interface unit 32 to notify the corresponding IP address of the obtained URL (step S99). Upon receipt of this instruction, the network interface unit 32 notifies the IP address of the URL. Then, the automatic calling unit 44 repeats the processes in and after step S96.

If S_FLAG_S=OFF in step S98, the automatic calling unit 44 repeats the processes in and after step S96 without notifying the URL. If the extracted data indicates the end of the IP address table 54 in step S97, the automatic calling unit 44 terminates the processing.

For example, in the IP address table shown in FIG. 15, the IP address in the first line corresponds to the local side computer 82, and S_FLAG_S=OFF. Accordingly, the notification of the URL is skipped, and the data in the second line is extracted. The IP address in the second line corresponds to the remote side computer 83, and S_FLAG_S=ON. Accordingly, the URL is notified to this IP address. Similar processing is performed also for the data in and after the third line.

When the URL of a bookmark is selected in step S93, the operation buttons shown in FIG. 4 may be used. The processes for selecting and obtaining a URL in this case are similar to those performed in steps S4 through S11 and S18 shown in FIG. 7.

Figure 20:
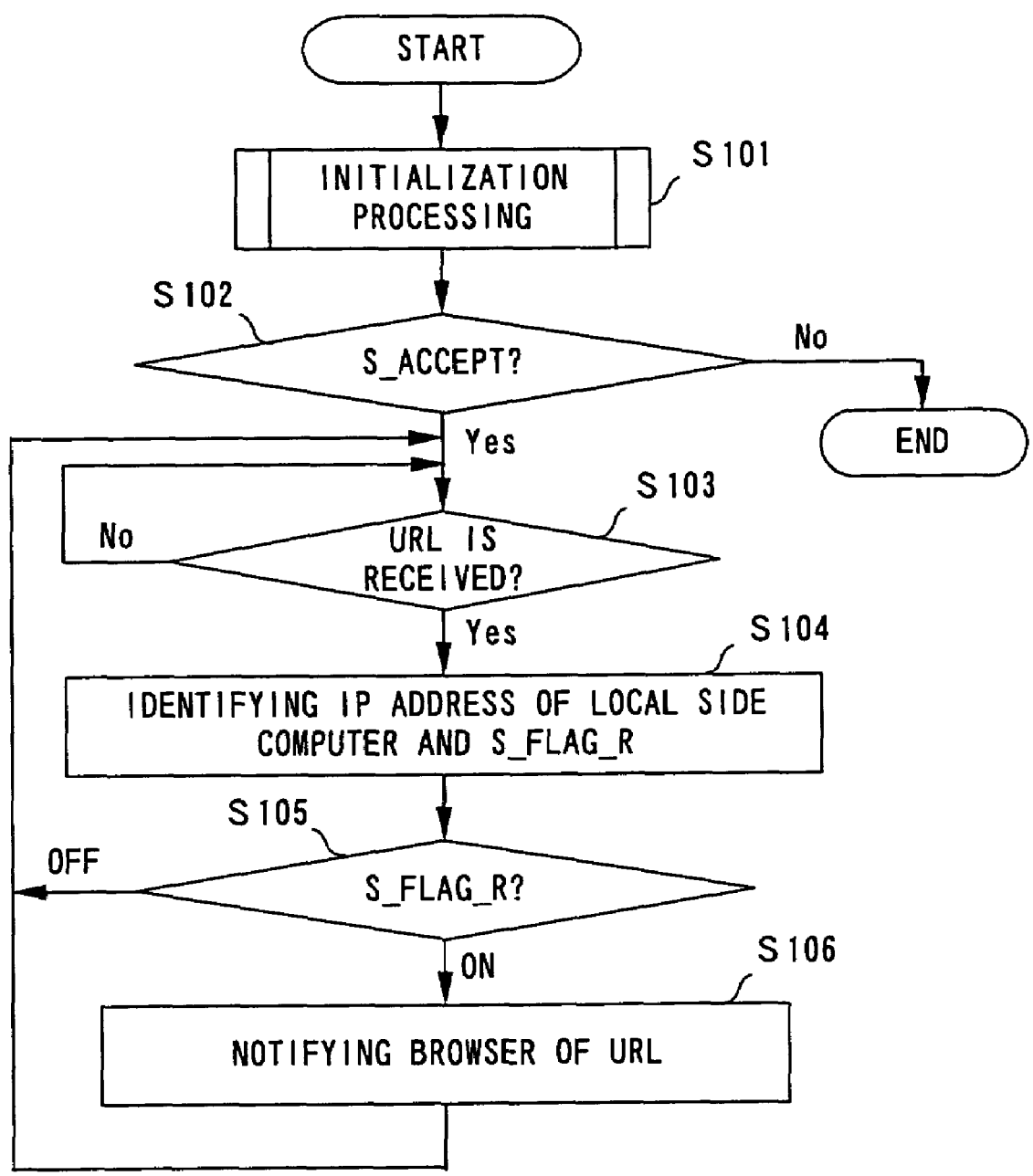
FIG. 20 is a flowchart showing display control processing on a remote side.

FIG. 20 is a flowchart showing the display control processing performed by the slide show processing unit 31 on the remote side. First of all, the web page display control unit 45 performs the initialization processing shown in FIG. 17 (step S101), and examines the value of the flag S_ACCEPT in the operation control parameter file 51 (step S102). If S_ACCEPT=No, the web page display control unit 45 terminates the processing.

If S_ACCEPT=Yes, the web page display control unit 45 determines whether or not the network interface unit 32 receives a URL from the local side computer 82 (step S103). If the network interface unit 32 does not receive a URL, the web page display control unit 45 repeats the determination. If the network interface unit 32 receives a URL, the web page display control unit 45 identifies the IP address of the local side computer 82 (step S104). Then, the web page display control unit 45 extracts the flag S_FLAG_R corresponding to that IP address from the IP address table 54, and examines its value (step S105).

If S_FLAG_R=OFF, the web page display control unit 45 repeats the processes in and after step S103. If S_FLAG_R=ON, the web page display control unit 45 notifies the WWW browser 33 of the received URL (step S106), and repeats the processes in and after step S103. The processing of the WWW browser 33 is similar to that shown in FIG. 8.

For example, in the IP address table shown in FIG. 15, S_FLAG_R=ON for the IP address of the local side computer 82 (teacher's machine). Accordingly, the URLs received from the local side are sequentially notified to the WWW browser 33, and the pages corresponding to the URLs are displayed.

Figure 21:
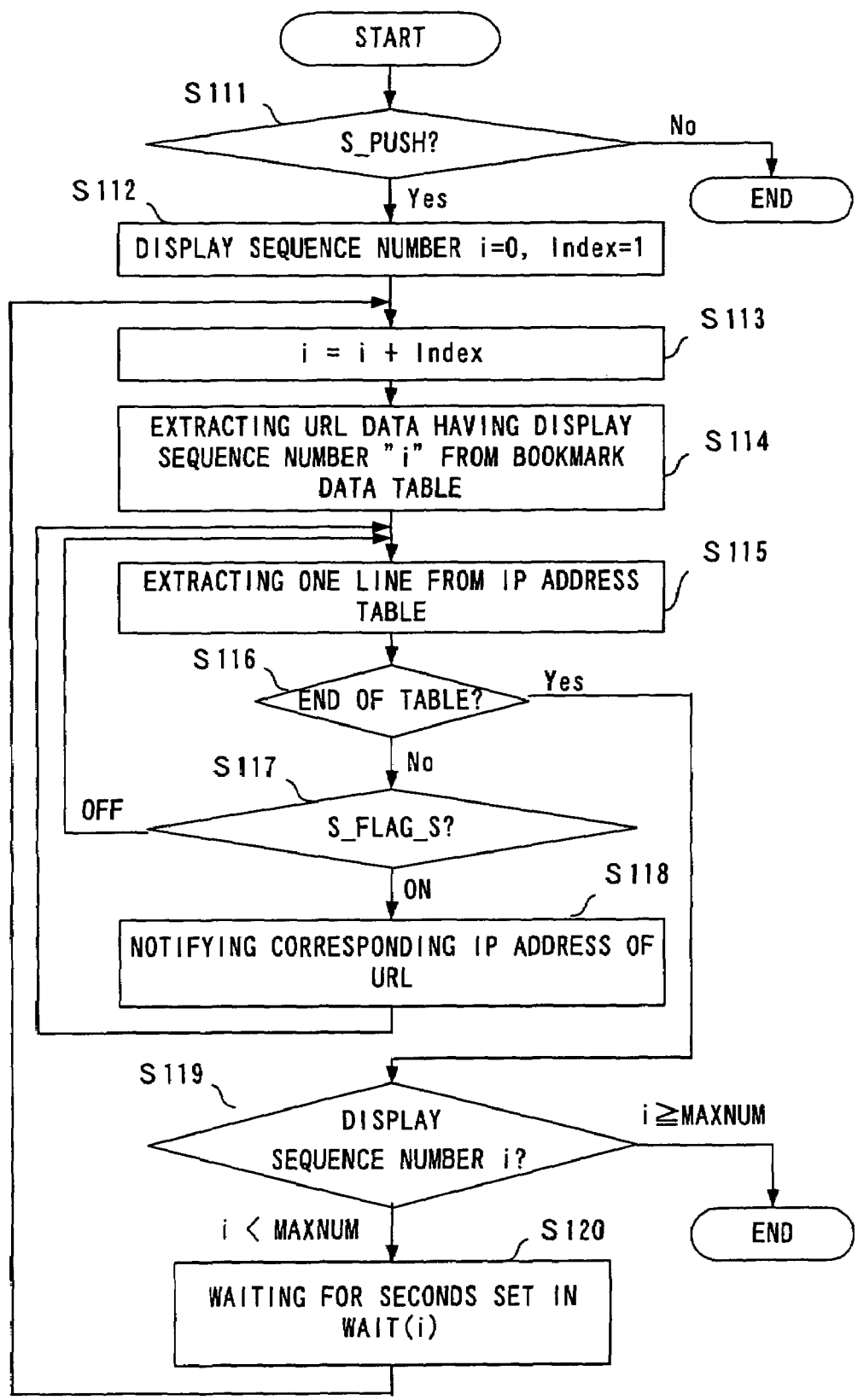
FIG. 21 is a flowchart showing automatic processing on the local side.

FIG. 21 is a flowchart showing the automatic processing performed in step S74 of FIG. 16. In the automatic processing, the automatic calling unit 44 examines the value of the flag S_PUSH in the operation control parameter file 51 (step S111). If S_PUSH=No, the automatic calling unit 44 terminates the processing.

If S_PUSH=Yes, the automatic calling unit 44 assigns "0" to a control variable "i" representing a display sequence number and "1" to a variable "Index" representing a difference of the display sequence number (step S112). Next, the automatic calling unit 44 resets as "i" the value obtained by adding "Index" to the display sequence number "i" (step S113), and extracts the URL of the display sequence number "i" from the bookmark data file 52 (step S114).

The processes performed in steps S115 through S118 are similar to those performed in steps S96 through S99 of FIG. 18. The processing performed by the slide show processing unit 31 on the remote side, to which a URL is notified in step S118, is similar to that shown in FIG. 20.

If the extracted data indicates the end of the IP address table 54 in step S116, the value of the display sequence number "i" is examined (step S119). If i<MAXNUM, the processes in and after step S113 are repeated after the time set in "WAIT(i)" elapses (step S120). When "i" reaches MAXNUM, no greater display sequence numbers exist. The automatic processing is therefore be terminated.

Figure 22:
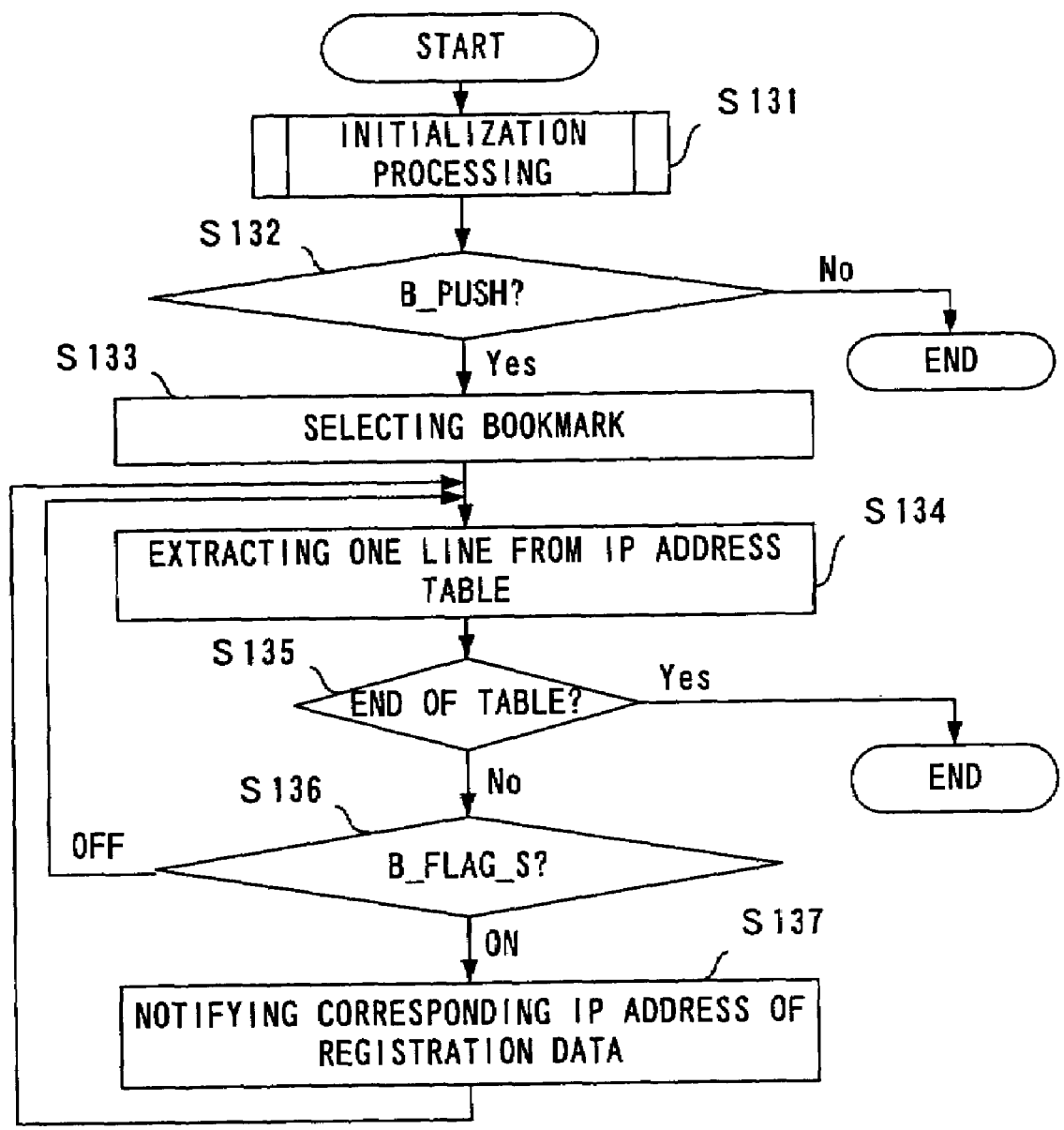
FIG. 22 is a flowchart showing registration processing on the local side.

FIG. 22 is a flowchart showing the registration processing performed by the slide show processing unit 31 on the local side. First of all, the automatic calling unit 44 performs the initialization processing shown in FIG. 17 (step S131), and examines the value of the flag B_PUSH in the operation control parameter file 51 (step S132). If B_PUSH=No, the automatic calling unit 44 terminates the processing.

If B_PUSH=Yes, the automatic calling unit 44 obtains the bookmark data selected by a teacher from the bookmark data file 52 (step S133). Next, the automatic calling unit 44 extracts the text data of one line from the IP address table 54 (step S134), and determines whether or not the extracted data indicates the end of the IP address table 54 (step S135). If the extracted data does not indicate the end of the IP address table 54, the automatic calling unit 44 examines the value of the flag B_FLAG_S included in that data (step S136).

If B_FLAG_S=ON, the automatic calling unit 44 instructs the network interface unit 32 to notify the corresponding IP address of the obtained bookmark data (step S137). Upon receipt of the bookmark data, the network interface unit 32 notifies the IP address of the bookmark data as registration data. Then, the automatic calling unit 44 repeats the processes in and after step S134.

If B_FLAG_S=OFF in step S136, the automatic calling unit 44 repeats the processes in and after step S134 without notifying the bookmark data. If the extracted data indicates the end of the IP address table 54, the automatic calling unit 44 terminates the processing.

For example, in the IP address table shown in FIG. 15, the IP address in the first line corresponds to the local side computer 82, and B_FLAG_S=OFF. Accordingly, the notification of the bookmark data is skipped, and the data in the second line is extracted. The IP address in the second line corresponds to the remote side computer 83, and B_FLAG_S=ON. As a result, the bookmark data is notified to the IP address data. Similar processing is performed also for the data in and after the third line.

FIG. 23 is a flowchart showing the registration processing performed by the slide show processing unit 31 on the remote side. First of all, the bookmark registration unit 42 performs the initialization processing shown in FIG. 17 (step S141), and examines the value of the flag B_ACCEPT in the operation control parameter file 51 (step S142). If B_ACCEPT=No, the bookmark registration unit 42 terminates the processing.

If B_ACCEPT=Yes, the bookmark registration unit 42 determines whether or not the network interface unit 32 receives the bookmark data from the local side computer 82 (step S143). If the bookmark data is not received, the bookmark registration unit 42 repeats the determination. If the bookmark data is received, the bookmark registration unit 42 identifies the IP address of the local side computer 82 (step S144). Then, the bookmark registration unit 42 extracts the flag B_FLAG_R corresponding to the IP address from the IP address table 54, and examines its value (step S145).

If B_FLAG_R=OFF, the bookmark registration unit 42 repeats the processes in and after step S143. If B_FLAG_R=ON, the bookmark registration unit 42 registers the received bookmark data to the bookmark data file 52 (step S146) and repeats the processes in and after step S143.

For example, in the IP address table shown in FIG. 15, B_FLAG_R=ON for the IP address of the local side computer 82 (teacher's machine). Accordingly, the bookmark data received from the local side is registered to the bookmark data file 52.

With such registration processing, specified bookmark data can be registered to the remote side computer 83 based on the instruction from the local side computer 82.

Additionally, the remote side computer 83 can download target web pages for a slide show by using notified bookmark data, and can store the downloaded pages in the web page data file 53 as local files. In this case, the local side computer 82 notifies the remote side computer 83 of the URLs of those local files, and makes the remote side computer 83 perform the slide show.

In the above described remote slide show system shown in FIG. 12, the LAN 84 is used to interconnect the local side computer 82 and the remote side computer 83. However, a similar remote slide show can be implemented also if a different network such as a WAN (Wide Area Network), etc. is used.

As the slide show system shown in FIG. 2B and the computers 82 and 83 shown in FIG. 13, an information processing device (computer) shown in FIG. 24 can be used. The information processing device shown in FIG. 24 comprises a CPU (Central Processing Unit) 101, a memory 102, an input device 103, an output device 104, an external storage device 105, a medium driving device 106, and a network connection device 107, which are interconnected by a bus 108.

The memory 102 includes, for example, a ROM (Read Only Memory), a RAM (Random Access Memory), etc., and stores programs and data used for processing. The CPU 101 performs necessary processing by executing the programs with the memory 102.

Here, the slide show processing unit 31, the operation control parameter edition unit 41, the bookmark registration unit 42, the bookmark display control unit 43, the automatic calling unit 44, the web page display control unit 45, the BGM control unit 46, the narration control unit 41, the IP address table edition unit 48, etc. correspond to software components described by the programs, and are respectively stored in specific program code segments in the memory 102.

The input device 103 corresponds to the input device 23 shown in FIGS. 2B and 13, and is used to input an instruction or information from a user. The output device 104 includes the display device 24 and the speaker 25, which are shown in FIGS. 2B and 13, and is used to make an inquiry to a user and to output the information of a web page, BGM, narration, etc.

The external storage device 105 is, for example, a magnetic disk device, an optical disk device, a magneto-optical disk device, etc. A user can store the above described programs and data in the external storage device 105, and can use them by loading into the memory 102 depending on need. The external storage device 105 can be used also as the data storage device 22 shown in FIGS. 2B and 13.

The medium driving device 106 drives a portable storage medium 109, and accesses its stored data. As the portable storage medium 109, an arbitrary computer-readable storage medium such as a memory card, a floppy disk, a CD-ROM (Compact Disk-Read Only Memory), an optical disk, a magneto-optical disk, etc. is used. A user can store the above described programs and data onto the portable storage medium 109, and can use them by loading into the memory 102 as occasion demands.

The network connection device 107 is controlled by the network interface unit 32 shown in FIGS. 2B and 13, makes a connection to the Internet 27 via an arbitrary network (line) such as the LAN 84, etc., and performs data conversion accompanying a communication. The information processing device can receive the above described programs and data from an external device via the network connection device 107, and can use them by loading into the memory 102 depending on need.

Figure 25:
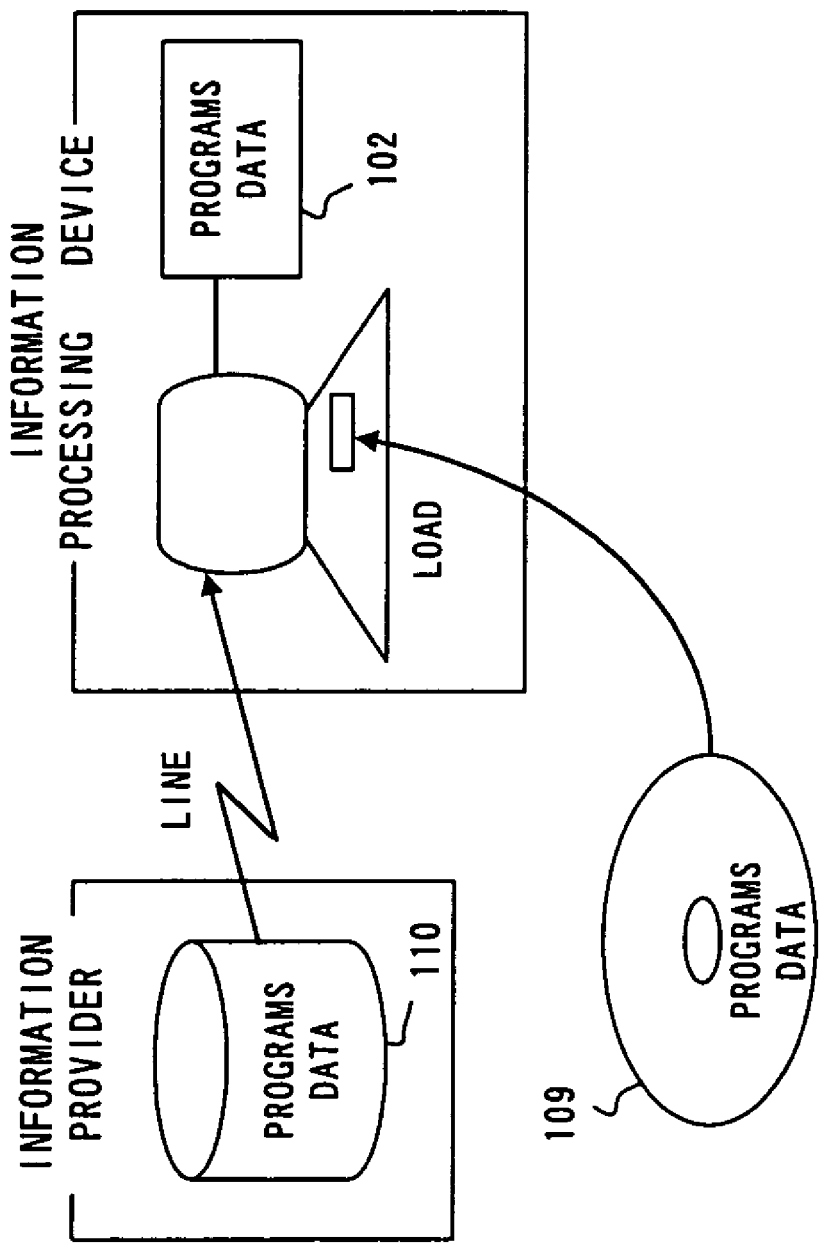
FIG. 25 is a diagram showing storage media.

FIG. 25 show computer-readable storage media which can provide programs and data to the information processing device shown in FIG. 24. The programs and data stored in the portable storage medium 109 or in an external database 110 are loaded into the memory 102. The CPU 101 then performs necessary processing by executing the programs with the data.

According to the present invention, information of one or more web pages can be easily and effectively displayed when a presentation or a conference takes place, using a WWW browser which refers to the information of the WWW.

In a manual mode, for example, a slide operation button is provided so that web pages can be sequentially accessed using existing bookmarks. Therefore, a user can smoothly progress a presentation without typing a URL.

Further, in an automatic mode, a plurality of web pages can be automatically displayed according to a predetermined sequence and a display time period. Therefore, a user can concentrate on a presentation without being directly involved in a display operation.

Further, since BGM and a narration can be automatically played back, an effective presentation can be performed according to the predetermined procedures.

What is claimed is:

1. A slide show system for a local side computer terminal and a plurality of remote side computer terminals, comprising:

a presenter controlled control unit obtaining URL information defined on a World Wide Web information network and used by the presenter to output information on the local side computer terminal, according to a predetermined output sequence;

an interface unit for sequentially transmitting a plurality of pieces of obtained URL information to the remote side computer terminals and for instructing an output of information by the remote side computers corresponding to the transmitted pieces of URL information as controlled by the presenter; and a storing unit storing a correspondence relationship between the plurality of pieces of URL information and a plurality of sequence numbers representing the output sequence and storing an address table which includes respective terminal addresses of the local side computer terminal and the remote side computer terminals and includes flag information indicating whether each of the terminal addresses is to be notified of the URL information, and wherein said presenter controlled control unit obtains a piece of URL information to be notified to the remote side computer terminals by referring to the correspondence relationship, determines whether each of the local side computer terminal and the remote side computer terminals is to be notified of the determined piece of URL information by referring to the address table and causes data accessed using the URL information to be displayed at a predetermined interval indicating a display time period of each page accessed using the URL information via each remote side computer terminal determined to be notified of the URL information.

2. The slide show system according to claim 1 wherein said presenter controlled control unit stores bookmark data which is caused to be registered into at least one of the remote side computer terminals based on an instruction from the local side computer terminal.

3. A slide show system for a remote side computer terminal, comprising:

a browser unit obtaining information by using URL information defined on a World Wide Web information network;

an interface unit receiving a plurality of pieces of URL information which are sequentially transmitted from a local side presenter controlled computer terminal and are used by the presenter to output information on the local side presenter controlled computer terminal according to a predetermined output sequence;

a control unit for notifying said browser unit of a received piece of URL information and for instructing an output of information corresponding to the notified piece of URL information; and a storing unit storing a correspondence relationship between the plurality of pieces of URL information and a plurality of sequence numbers representing the predetermined output sequence and storing an address table which includes respective terminal addresses of the local side presenter controlled computer terminal and a plurality of remote side computer terminals and includes flag information indicating whether the URL information transmitted from each of the terminal addresses is to be accepted, wherein said presenter controlled computer terminal obtains a piece of URL information to be transmitted from the local side presenter controlled computer terminal by referring to the correspondence relationship, said control unit determines whether the received piece of URL information is to be accepted and notified to the browser unit by referring to the address table and displays the data accessed using the URL information at a predetermined interval indicating a display time period of each page accessed using the URL information via each remote side computer terminal determined to be notified of the URL information.

4. The slide show system according to claim 3, wherein said control unit causes bookmark data stored in the local side presenter controlled computer terminal to be registered into a remote side computer terminal based on instruction from the local side presenter controlled terminal.

5. A computer-readable storage medium on which is recorded a program for causing a computer to execute a process for a local side presenter controlled computer terminal and a plurality of remote side computer terminals, said process comprising:

referring to a correspondence relationship between a plurality of pieces of URL information and a sequence number representing a predetermined output sequence, wherein the plurality of pieces of URL information is selected by the presenter and defined on a World Wide Web information network for the local side presenter controlled terminal;

determining whether each of the local side presenter controlled computer terminal and the remote side computer terminals is to be notified of the pieces of URL information by referring to an address table which includes respective terminal addresses of the local side presenter controlled computer terminal and the remote side computer terminals and includes flag information indicating whether each of the terminal addresses is to be notified of the URL information;

sequentially transmitting to a remote side computer terminal the plurality of pieces of URL information corresponding to a current sequence number; and instructing the remote side computer terminal to output information corresponding to each transmitted piece of URL information, where data accessed using the URL information is displayed at a predetermined interval indicating a display time period of each page accessed using the URL information via each remote side computer terminal determined to be notified of the URL information.

6. A computer-readable storage medium on which is recorded a program for causing a computer to execute a process for a plurality of remote side computer terminals, said process comprising:

receiving from a local side presenter controlled computer terminal a plurality of pieces of URL information and a sequence number representing a predetermined output sequence, wherein the plurality of pieces of URL information is selected by the presenter and corresponds to a current sequence number which is obtained from a correspondence relationship between the plurality of pieces of address information defined on a World Wide Web information network;

determining whether the received piece of URL information is to be accepted and notified to the browser unit by referring to an address table which includes respective terminal addresses of the local side presenter controlled computer terminal and a plurality of remote side computer terminals and includes flag information indicating whether the URL information transmitted from each of the terminal addresses is to be accepted;

notifying a browser of each received piece of received URL information; and instructing the browser to output information corresponding to each received piece of notified URL information, where data accessed using the URL information is displayed at a predetermined interval indicating a display time period of each page accessed using the URL information via each remote side computer terminal determined to be notified of the URL information.

7. A presentation process, comprising:

obtaining a sequence of material segments to be presented and selected by a presenter, with the segments having corresponding URLs in a presenter computer;

determining whether remote computer terminals are to receive the segments by referring to an address table which includes respective addresses of the presenter computer and the remote computer terminals and includes flag information indicating whether each of the remote computer terminals are to receive the segments;

transmitting the URLs one at a time to the remote computer terminals in accordance with the sequence;

retrieving the segments from the presenter computer responsive to the URLs;

presenting the material segments to users via the remote computer terminals;

storing a correspondence relationship between the URLs and the sequence of material segments to be presented; and obtaining one of the URLs transmitted to the remote computer terminals by referring to the correspondence relationship, where data accessed using the URL information is displayed at a predetermined interval indicating a display time period of each page accessed using the URL information via each remote computer terminal determined to be notified of the URL information.

* * * * *